(12) United States Patent
Reynolds

(10) Patent No.: US 8,181,043 B1
(45) Date of Patent: May 15, 2012

(54) METHODS AND APPARATUS FOR IMPROVED REMOTELY SWITCHABLE POWER SUPPLY

(75) Inventor: Charles H. Reynolds, Gilroy, CA (US)

(73) Assignee: Cyber Switching, Inc., Santa Clara, CA (US)

( * ) Notice: Subject to any disclaimer, the term of this patent is extended or adjusted under 35 U.S.C. 154(b) by 1006 days.

(21) Appl. No.: 11/933,419

(22) Filed: Oct. 31, 2007

Related U.S. Application Data

(63) Continuation-in-part of application No. 10/007,150, filed on Nov. 30, 2001, now abandoned, and a continuation-in-part of application No. 09/471,101, filed on Dec. 21, 1999, now abandoned, and a continuation-in-part of application No. 09/309,321, filed on May 11, 1999, now abandoned.

(60) Provisional application No. 60/250,820, filed on Dec. 1, 2000.

(51) Int. Cl.
*G06F 1/00* (2006.01)
*G06F 15/173* (2006.01)
*H02B 1/00* (2006.01)
*H05K 5/00* (2006.01)
*H05K 7/00* (2006.01)

(52) U.S. Cl. .... 713/300; 709/223; 361/601; 361/679.01

(58) Field of Classification Search .................. 713/300, 713/340; 340/825, 693.1
See application file for complete search history.

(56) References Cited

U.S. PATENT DOCUMENTS

| | | | |
|---|---|---|---|
| 4,138,718 | A | 2/1979 | Toke et al. |
| 4,545,631 | A | 10/1985 | Zampini |
| D288,092 | S | 2/1987 | Towell et al. |
| D288,920 | S | 3/1987 | Oesterheld et al. |
| 4,731,029 | A | 3/1988 | Lerner et al. |
| 4,840,570 | A | 6/1989 | Mann et al. |
| D306,155 | S | 2/1990 | Stahler et al. |
| 4,993,970 | A | 2/1991 | Littrell |
| 5,181,858 | A | 1/1993 | Matz et al. |
| 5,198,806 | A | 3/1993 | Lord |
| 5,199,878 | A | 4/1993 | Dewey et al. |
| 5,245,507 | A | 9/1993 | Ericksen |
| D340,699 | S | 10/1993 | Chen |
| 5,347,167 | A | 9/1994 | Singh |
| 5,359,540 | A | 10/1994 | Ortiz |
| D354,737 | S | 1/1995 | Fladung |
| D356,297 | S | 3/1995 | Carl et al. |
| 5,424,587 | A | 6/1995 | Federowicz |
| D360,191 | S | 7/1995 | Carl et al. |

(Continued)

FOREIGN PATENT DOCUMENTS

WO 93/10615 A1 5/1993

(Continued)

OTHER PUBLICATIONS

Norton's Telecom Dictionary by Harry Newton, Mar. 1998, p. 45.

(Continued)

*Primary Examiner* — Kim Huynh
*Assistant Examiner* — Brandon Kinsey
(74) *Attorney, Agent, or Firm* — Stephen J. LeBlanc; Quine Intellectual Property Law Group, P.C.

(57) ABSTRACT

Methods and apparatus systems for remotely controllable power supplies for various network devices in various situations.

8 Claims, 25 Drawing Sheets

U.S. PATENT DOCUMENTS

| | | | |
|---|---|---|---|
| D366,248 S | | 1/1996 | Owens |
| 5,493,542 A | | 2/1996 | Odelid |
| 5,531,611 A | | 7/1996 | Reed et al. |
| 5,538,438 A | | 7/1996 | Orlando |
| 5,563,455 A | | 10/1996 | Cheng |
| 5,632,648 A | | 5/1997 | Iiu |
| D380,447 S | | 7/1997 | Chen et al. |
| 5,644,174 A | | 7/1997 | Cheng et al. |
| 5,649,839 A | | 7/1997 | Yu |
| 5,652,892 A | | 7/1997 | Ugajin |
| 5,658,166 A | | 8/1997 | Freeman et al. |
| 5,801,921 A | | 9/1998 | Miller |
| 5,836,786 A | | 11/1998 | Pepe |
| D406,259 S | | 3/1999 | Lindahl |
| 5,903,558 A | | 5/1999 | Jones et al. |
| 5,923,103 A | * | 7/1999 | Pulizzi et al. ............. 307/126 |
| 5,949,974 A | | 9/1999 | Ewing et al. |
| 5,956,227 A | | 9/1999 | Kitaoka |
| 5,991,885 A | | 11/1999 | Chang |
| 6,020,824 A | | 2/2000 | Tamura et al. |
| 6,102,296 A | | 8/2000 | Snider |
| 6,121,695 A | | 9/2000 | Loh |
| 6,134,668 A | | 10/2000 | Sheikh |
| 6,169,661 B1 | | 1/2001 | Lee |
| 6,501,195 B1 | * | 12/2002 | Barton ..................... 307/125 |
| 6,741,442 B1 | * | 5/2004 | McNally et al. ........... 361/166 |
| 6,756,998 B1 | | 6/2004 | Bilger |
| 7,099,934 B1 | * | 8/2006 | Ewing et al. .............. 709/223 |
| 2002/0002582 A1 | * | 1/2002 | Ewing et al. .............. 709/202 |

FOREIGN PATENT DOCUMENTS

WO          00/69081 A1    11/2000

OTHER PUBLICATIONS

Server Technology, Inc. "Who Needs Power Management?" Network Power Management White Paper, Feb. 19, 1997, pp. 1-8.

Server Technology, Inc. "Sentry R-2000 Remote Power Manager", May 24, 1997, pp. 1-2.

eem 96, electronic engineers master catalog, 38$^{th}$ Edition, vol. D, Hearst Business Publishing, pp. 2260-2261,2326-2343.

Web Page http://www.seltronics.com/se03005.htm, p. 1 of 1.

Web Page http://www.majorpower.com/distribution/mpd100r.html, 2 pages.

Web Page http://www.marway.com/products/mpd100r.html, 2 pages.

Web Page http://www.marway.com/company/note.html, 2 pages.

Web Page http://www.pmpwest.com/pproduct.htm, 2 pages.

Web Page http://www.dataprobe.com/power1.html, 7 pages.

Web Page http://www.wti.com/power.htm, 8 pages.

Pulizzi Engineering, Inc. product description, 23 pages.

(1999) Cyber Switching, Inc. Power Cycle Units, Marketing Information, Wiring Diagrams and Mechanical and Design Descriptions pp. 1-28.

* cited by examiner

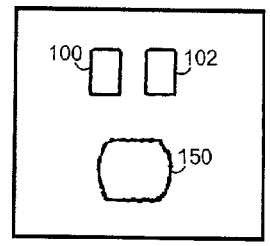
FIG. 1
(PRIOR ART)
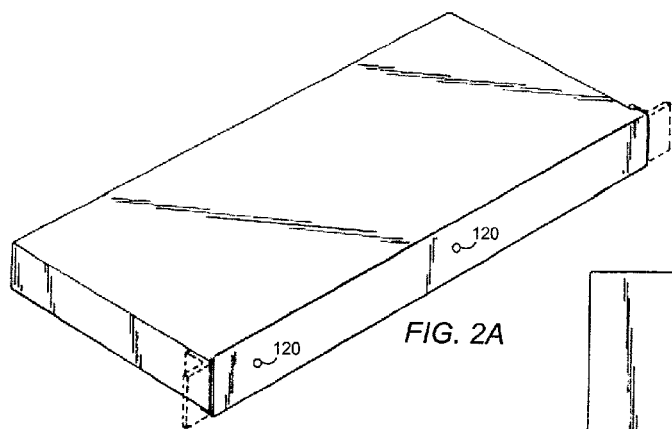
FIG. 2A
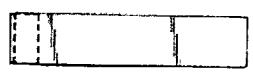
FIG. 2B
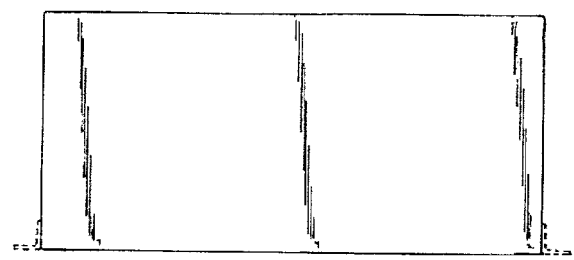
FIG. 2C
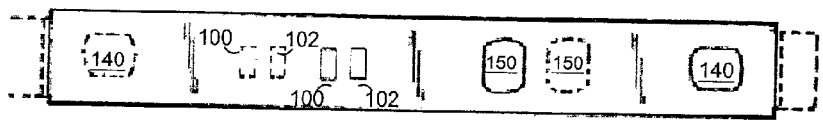
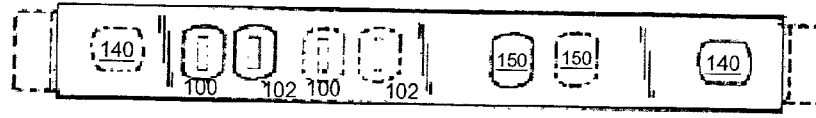
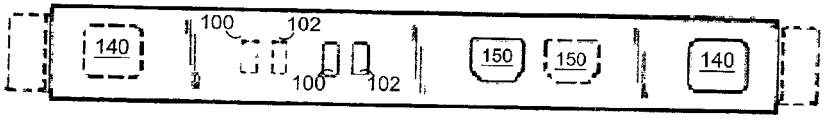
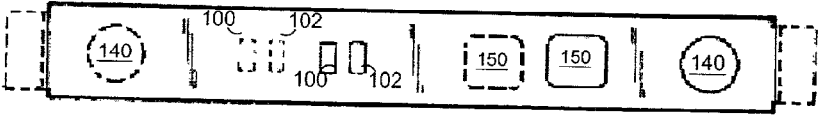
FIG. 3

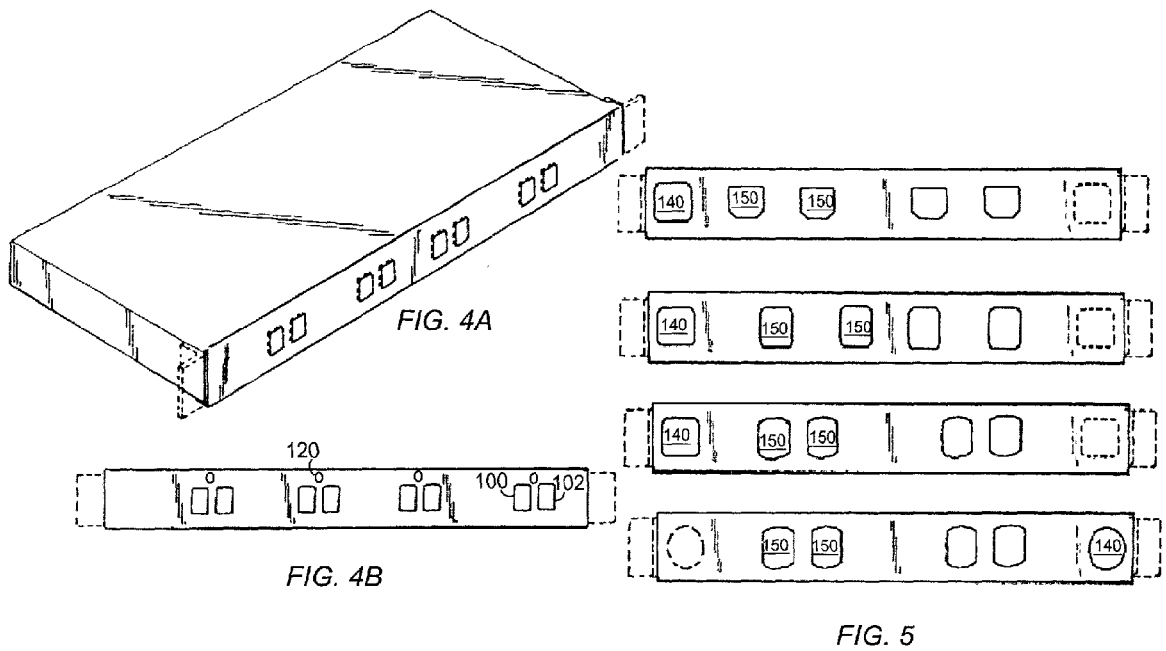
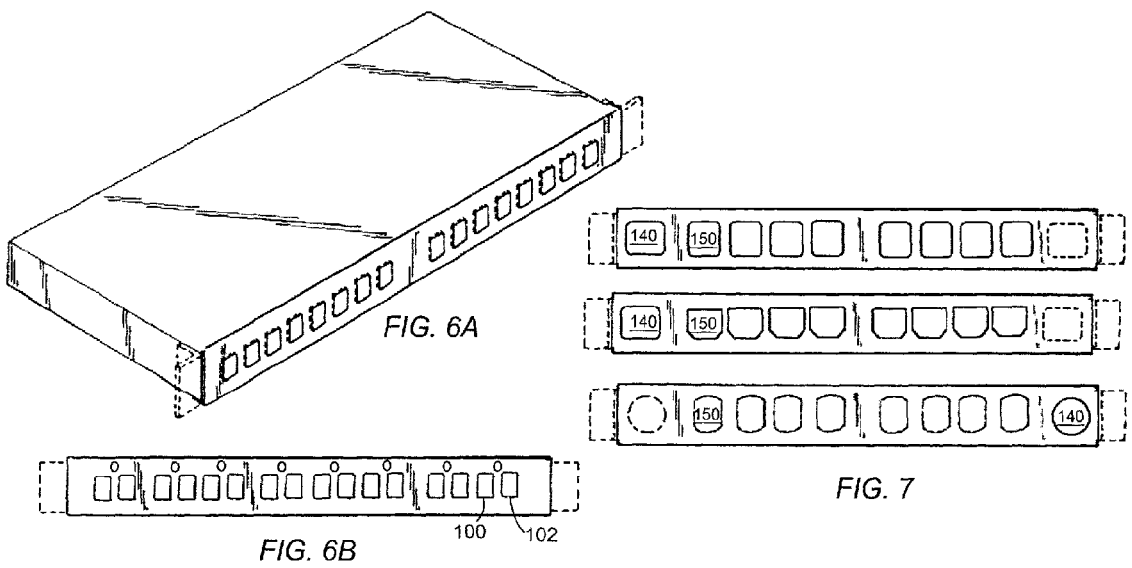

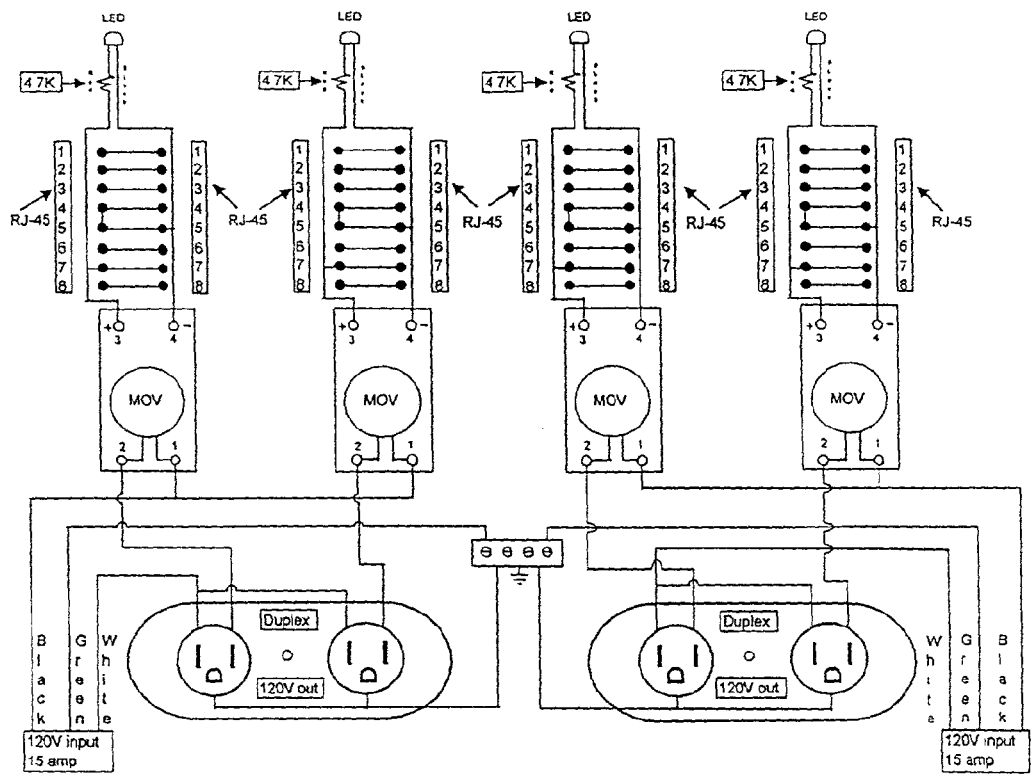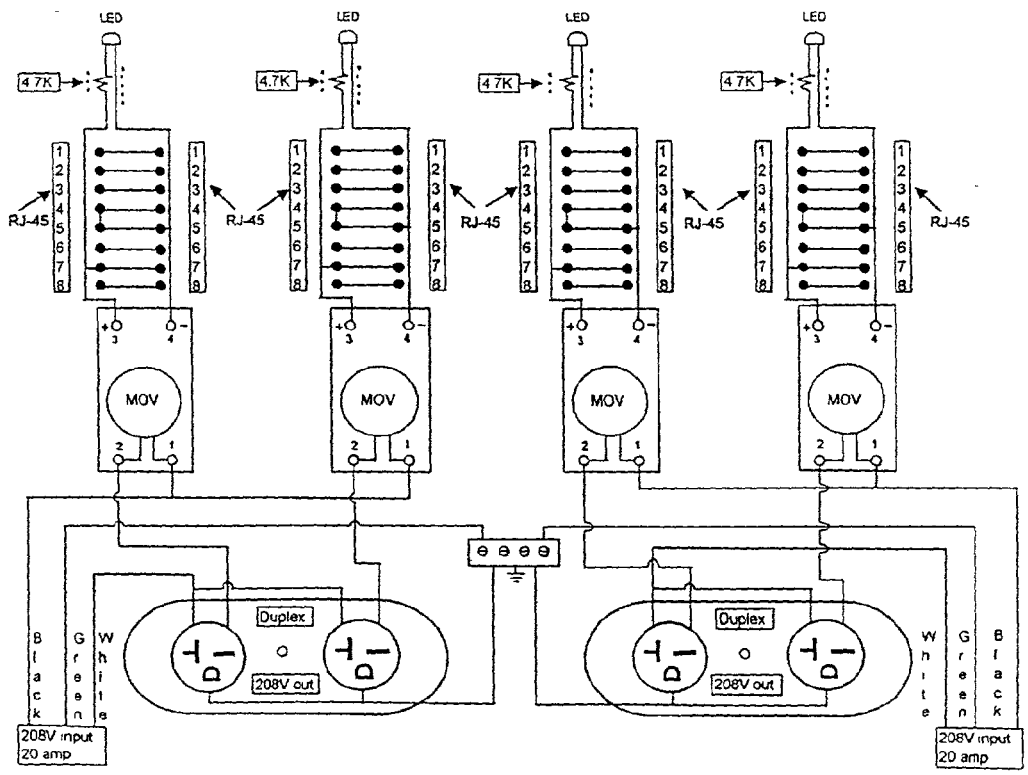
FIG. 12B

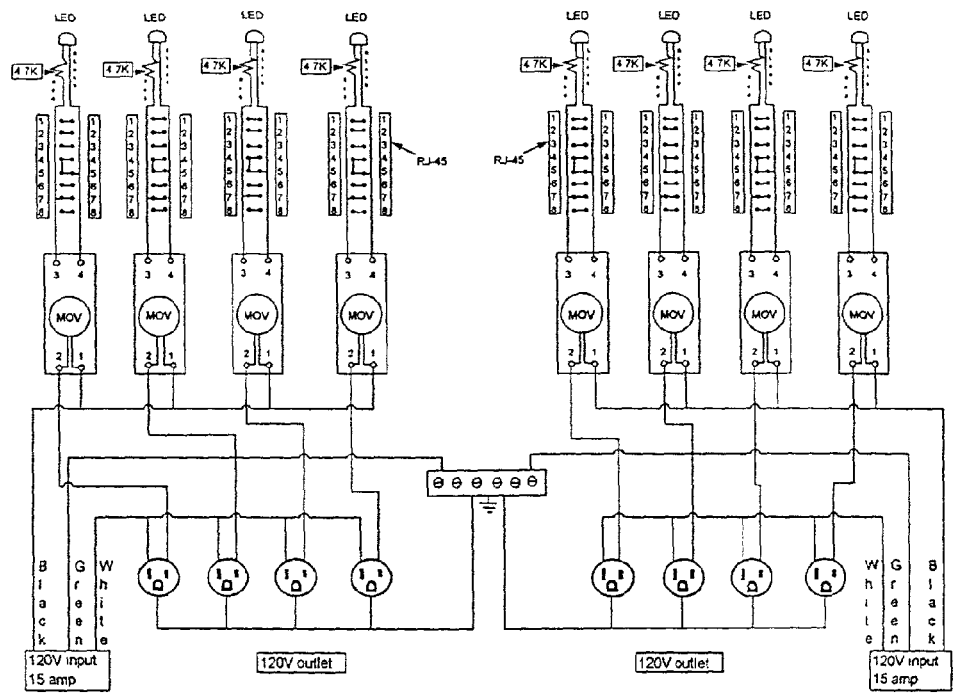
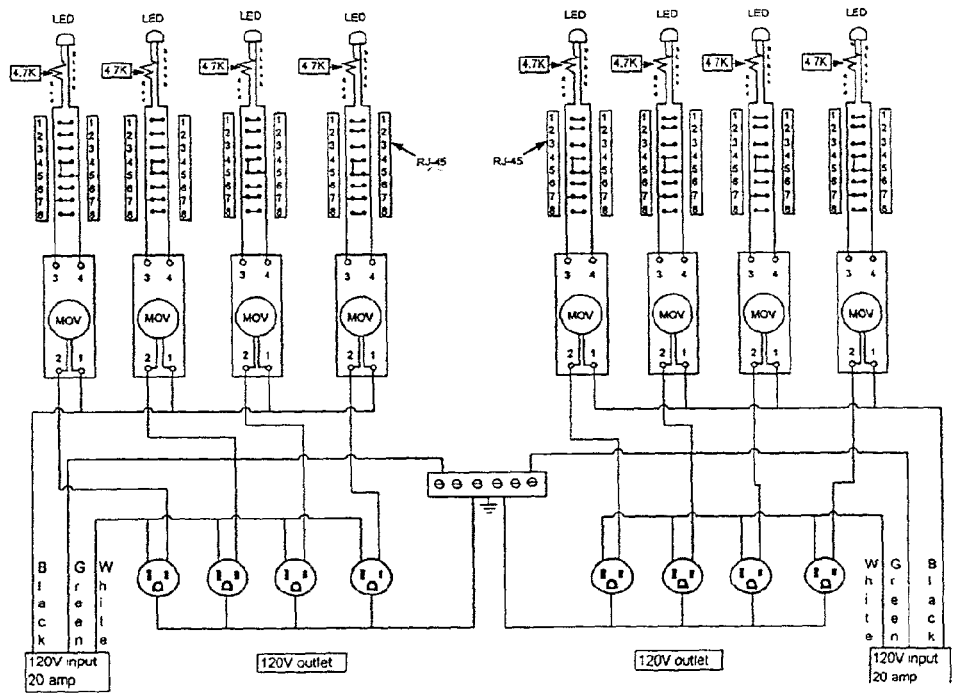
FIG. 13

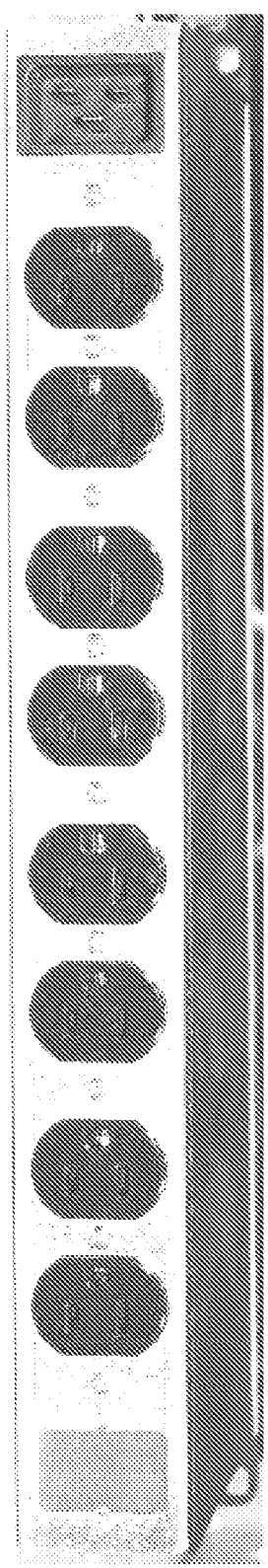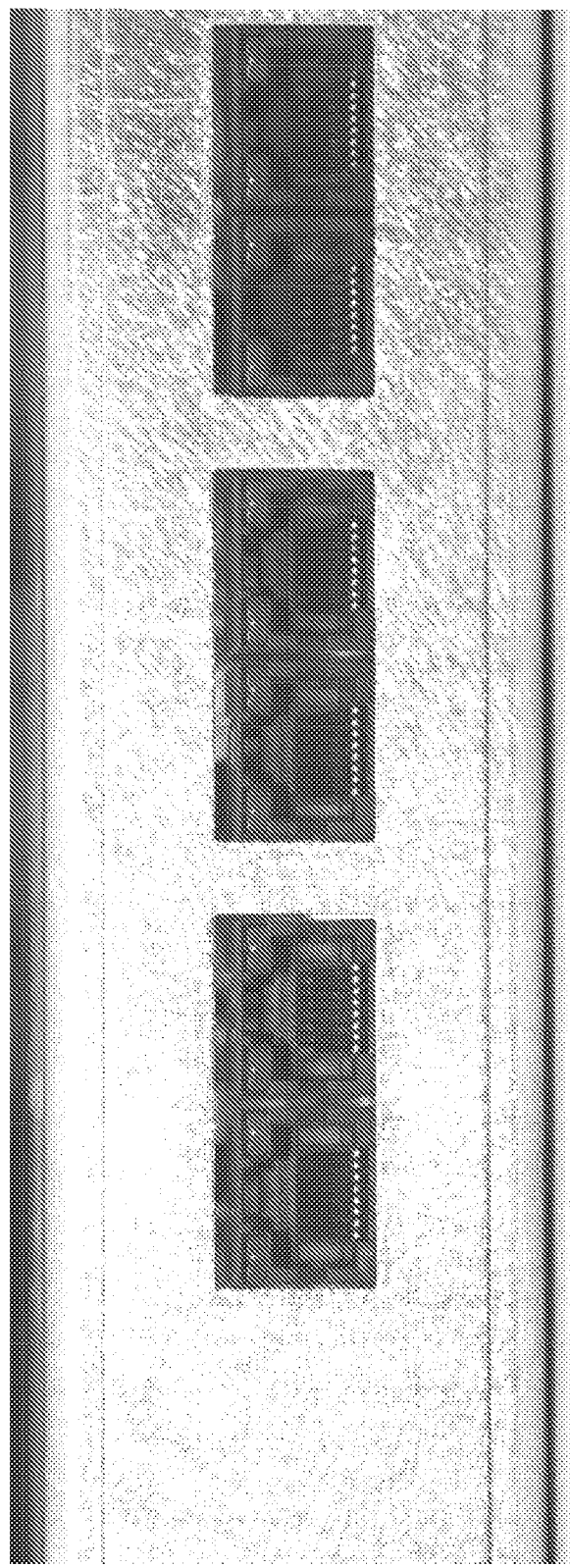
FIG. 18C  FIG. 18D

TYPICAL BOTH SIDES

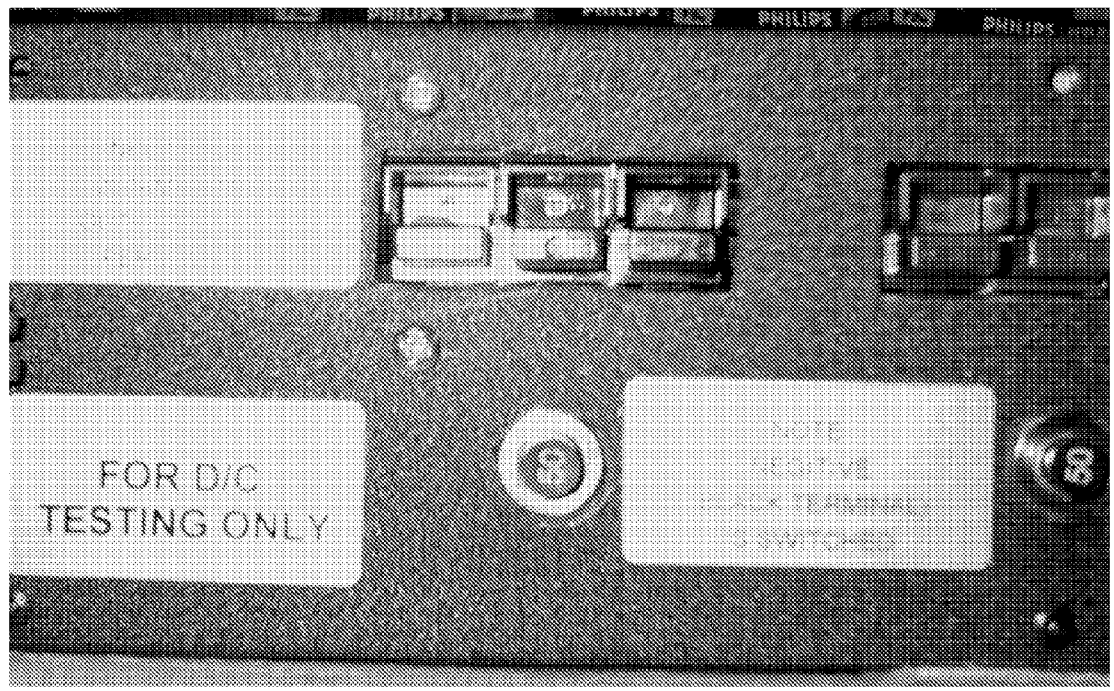
FIG. 22E
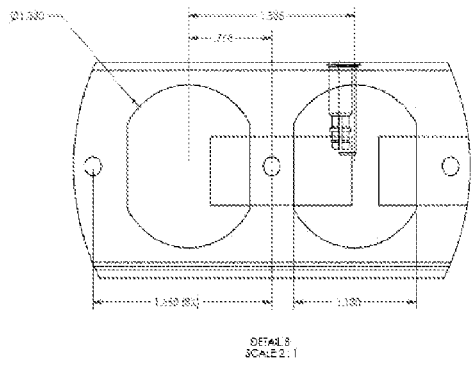
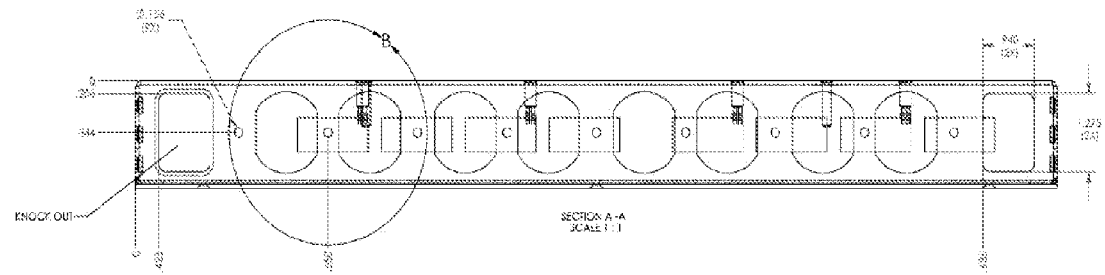
FIG. 20E

METHODS AND APPARATUS FOR IMPROVED REMOTELY SWITCHABLE POWER SUPPLY

CROSS REFERENCE TO RELATED APPLICATIONS

This application is a continuation in part of Ser. No. 10/007,150, filed Nov. 30, 2001, which claims priority from provisional application 60/250,820, filed Dec. 1, 2000. This application is a continuation in part of Ser. No. 09/471,101, filed Dec. 21, 1999. This application is a continuation in part of patent application Ser. No. 09/309,321 filed May 11, 1999.

This application is related to the following design applications, each by the same inventor:

REMOTELY SWITCHABLE POWER SUPPLY FOR NETWORK DEVICE RACKS HAVING PORTS AND OUTLETS ON ONE SURFACE filed 21 Dec. 1999, application Ser. No. 29/115,992;

REMOTELY SWITCHABLE POWER SUPPLY FOR NETWORK DEVICE RACKS HAVING EIGHT POWER OUTLET SOCKETS AND SIXTEEN NETWORK PORT SOCKETS, filed 21 Dec. 1999, application Ser. No. 29/115,990;

REMOTELY SWITCHABLE POWER SUPPLY FOR NETWORK DEVICE RACKS HAVING NETWORK PORTS AND POWER OUTLETS ON DIFFERENT SURFACES filed 21 Dec. 1999, application Ser. No. 29/115,991;

REMOTELY SWITCHABLE POWER SUPPLY FOR NETWORK DEVICE RACKS HAVING EIGHT NETWORK PORTS AND FOUR POWER OUTLETS; Ser. No. 29/104,720 filed May 11, 1999;

NETWORK REMOTELY SWITCHABLE POWER SUPPLY; Ser. No. 29/104,765, filed May 11, 1999; and NETWORK PORT AND POWER OUTLET PLACED ON A SWITCHABLE POWER SUPPLY; Ser. No. 29/104,721 filed May 11, 1999.

Each of these applications, and their file wrappers as available at the U.S.P.T.O. and all references included therein are hereby incorporated herein by reference for all purposes.

COPYRIGHT NOTICE

Pursuant to 37 C.F.R. 1.71(e), Applicants note that a portion of this disclosure contains material that is subject to and for which is claimed copyright protection (such as, but not limited to, source code listings, screen shots, user interfaces, or user instructions, or any other aspects of this submission for which copyright protection is or may be available in any jurisdiction.). The copyright owner has no objection to the facsimile reproduction by anyone of the patent document or patent disclosure, as it appears in the Patent and Trademark Office patent file or records. All other rights are reserved, and all other reproduction, distribution, creation of derivative works based on the contents, public display, and public performance of the application or any part thereof are prohibited by applicable copyright law.

FIELD OF THE INVENTION

The present invention is related to the field of electronic circuits and controllable power supplies therefore.

BACKGROUND OF THE INVENTION

Early in the development of modern networking equipment such as routers, switches, and the like it was realized that at times a particular piece of network equipment might hang or crash. In such instances, a human operator often had to intervene by traveling to the location of the equipment and rebooting or power cycling the equipment in order to get that particular piece of equipment working.

Responding to these needs, the inventor of the present invention, as early as 1994, constructed a "power cycle box." The original design contained two network ports and a control relay connected to at least one power outlet. From the exterior, the supply arranged two network socket connections and a power outlet socket on the same surface of the power supply (the front or the top), and in some instances included an indicator light. A diagram of such a design is shown in FIG. 1. In this design, a particular network signal could be sent through the two network ports which would cause the control relay to disconnect the power supply from the power outlet, thereby, shutting off power to the controlled network device. Another signal would reestablish power, thereby, causing the controlled device to reboot. An alternative design arranged more than one controlled power supply socket with corresponding network sockets on a surface of the power supply. Typically, in this earlier design, some network signal had to be present through the connectors for the power outlets to be on.

SUMMARY

While the above mentioned designed proved both useful and successful in the marketplace, for many years a need has been felt for a more compact and streamlined design that could be fitted efficiently into a standard network rack. However, it is difficult to construct such a design because of the restrictions on placement of elements within the control circuit, which must be sufficiently far apart to provide clearance between the network data connections and the AC power connections to prevent electromagnetic interference. An additional desired feature was for multiple controlled power supplies.

It has further been discovered that in some applications there is a need for all power and network sockets to be on the same side of rack-sized unit. There is therefore a need for a new design to address this issue with wider plugged computer systems.

It has further been discovered that in some applications, it is desired that a controllable power supply be in a default closed position so that absent a control signal, power will remain on. In such a design, it is desirable for a power supply to be controlled by a non-pass through signal.

It has further been discovered that more easily manufactured designs are desirable in order to reduce costs and improve product quality.

It has further been discovered that power supplies capable of providing large current load DC current and switched as described herein are useful in particular networking applications.

A further understanding of the invention can be had from the detailed discussion of specific embodiments below. For purposes of clarity, this discussion refers to devices, methods, and concepts in terms of specific examples. However, the method of the present invention may operate with a wide variety of types of connection sockets for network signals or power. It is therefore intended that the invention not be limited except as provided in the attached claims.

According to further embodiments of the invention, one or more controlled power outlets are housed in a power supply housing, the housing having the desirable characteristic that the height of the housing allows it to be mounted in a standard network device rack occupying one rack unit.

In one embodiment, to accomplish this configuration, controlled power outlets are distributed on one surface of the housing, and sockets for receiving a control signal are distributed on a different surface.

In a further embodiment, where it is desirable to have all outlets on one surface, possible to align them with a particular piece of controlled equipment, controlled power outlets and sockets are distributed on a single surface, but in such a way as to prevent electrical interference with network signals.

In various embodiments, one or more independently controlled power sockets may be provided, and one or more power sockets may be controlled by each control signal socket.

In a further embodiment, power into the controlled power supply is delivered via a detachable power cord. The detachable power cord has one end that attaches into the power socket and a different end that attaches into an outside power supply, such as a wall outlet. Thus, a controlled power supply according to this embodiment may be used with a variety of different available plug configurations, such as different outlets commonly provided in the U.S. versus European countries.

In a further embodiment, the circuitry in a power supply can operate with a range of different incoming supply voltages and currents and provide a controlled supply output at the available voltage or current.

Various embodiments of the invention provide different configurations of, such as supplies with one independently controlled supply outlet circuit, with two circuits, with four circuits, with eight circuits, or with some other number of circuits that can be mounted in the available space. In each case, a pair of network connectors is provided for each independently controlled outlet (or group of outlets) and a network signal is routed through the connectors to provide a control signal. In various embodiments, where space permits, more than one outlet may be supplied for a single control signal pair, but in such cases, power in that outlet is controlled by the same network signal.

A further understanding of the invention can be had from the detailed discussion of specific embodiments below. For purposes of clarity, this discussion refers to devices, methods, and concepts in terms of specific examples. However, the method of the present invention may operate with a wide variety of types of connection sockets for network signals or power. It is therefore intended that the invention not be limited except as provided in the attached claims.

All publications, patents, and patent applications cited herein are hereby incorporated by reference in their entirety for all purposes. The invention will be better understood with reference to the following drawings and detailed description.

BRIEF DESCRIPTION OF THE DRAWINGS

FIG. 1 is a block diagram of a housing and controlled power supply according to the prior art.

FIGS. 2A-C is a diagram showing a front view, top view, and side view, of a power supply according to specific embodiments of the invention wherein the power supply has control sockets and power sockets on the same surface.

FIG. 3 illustrates rear views of four alternative embodiments of a power supply according to specific embodiments of the invention, wherein each alternative includes at least one pair of control signal sockets 100 and 102, at least one power input connection 140, and at least one controlled power output 150. One difference in embodiments is the shape and configuration of different connection sockets.

FIGS. 4A-B is a diagram showing a top plane view and front view of a power supply according to specific embodiments of the invention wherein the power supply has four independent pairs of control sockets.

FIG. 5 illustrates rear views of four alternative embodiments of a power supply according to specific embodiments of the invention, wherein each alternative includes at least one power input connection 140 and four independently controlled power outputs 150. One difference in embodiments is the shape and configuration of different connection sockets.

FIGS. 6A-B is a diagram showing a top plane view and front view of a power supply according to specific embodiments of the invention wherein the power supply has eight independent pairs of control sockets.

FIG. 7 illustrates rear views of three alternative embodiments of a power supply according to specific embodiments of the invention, wherein each alternative includes at least one power input connection 140 and eight independently controlled power outputs 150. One difference in embodiments is the shape and configuration of different connection sockets.

FIGS. 12A-B show four alternative wiring diagrams of a power supply according to specific embodiments of the invention, wherein each alternative includes four pairs of control signal sockets 100 and 102, two power input connections 140, and four independently-controlled power outputs 150.

FIG. 13 shows two alternative wiring diagrams of a power supply according to specific embodiments of the invention, wherein each alternative includes eight pairs of control signal sockets 100 and 102, two power input connections 140, and eight independently-controlled power outputs 150.

FIGS. 18A-D show the external appearance of a housing and network sockets and power outlets of a further embodiment according to the present invention.

FIGS. 20A-E show schematic line drawings for an external housing components of a further embodiment according to the present invention.

FIGS. 22A-E show the external appearance and internal wiring and components of a two-rack unit high-current DC power supply with pass-through network control according to specific embodiments of the invention.

DESCRIPTION OF SPECIFIC EMBODIMENTS

Figure 8A:
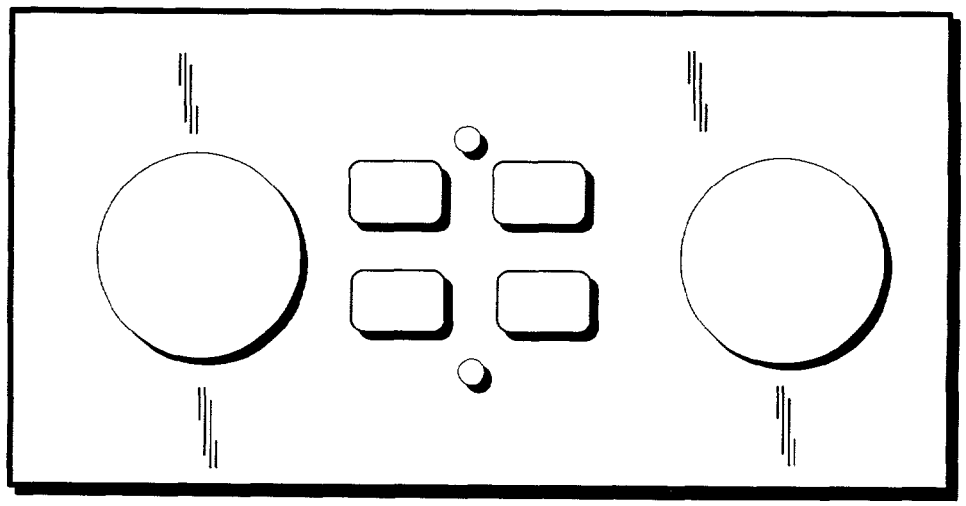
FIGS. 8A-C show alternative top plane views of a power supply according to alternative specific embodiments of the invention wherein there are two pair of control sockets and two controlled outputs with various possible arrangements of control signal sockets and controlled outputs.

According to the invention, one or more controlled power supplies can be housed in a power supply housing as shown in FIG. 2 through FIG. 8. In one embodiment, the housings shown the figures has the desirable characteristic that the height (h) of the housing is such that the housing can be mounted in a standard network device rack and will occupy only one rack unit. As is known in the art, one rack unit in one well-known device standard is 1.75 inches.

FIGS. 2A-C is a diagram showing a front view, top view, and side view, of a power supply according to specific embodiments of the invention wherein the power supply has control sockets and power sockets on the same surface. As can be seen from the figure, in this embodiment, the invention is a box shape for mounting in a computer system or network device rack. One or more optional indicators 120 may be placed on a visually accessible an convenient location, such as the front, to indicate a power status of a box, with, for example, a lit indicator indicating that power is active to a socket 150.

FIG. 3 illustrates rear views of four alternative embodiments of a power supply according to specific embodiments of the invention, wherein each alternative includes at least one pair of control signal sockets 100 and 102, at least one power input connection 140, and at least one controlled power output 150. One difference in embodiments is the shape and configuration of different connection sockets. As is known in the art, a wide variety of different connector shapes and configurations are possible. FIG. 3 shows three different possible shapes for power input socket 140, which may be attached to a power supply by various detachable power cords having a variety of "wall" plugs for use in different power systems. Two different configurations are shown for network connectors 100 and 102. Three different possible configurations are shown for power outlet plug 150. It will be understood in the art that a wide variety of different configurations of sockets are possible according to the invention, as appropriate for different applications.

According to a further aspect, the various sockets shown in FIG. 3 may be arranged so as to reduce any possible electrical interference and provide proper clearances within the housing while also aligning appropriately to match plugs and connections on a controlled device, such as a network router.

In a further embodiment, network and power ports are arranged on one surface of the controller to correspond to their position on particular popular network devices, such as a Cisco® brand router, to allow for easy patching with the router connections.

FIGS. 4A-B is a diagram showing a top plane view and front view of a power supply according to specific embodiments of the invention wherein the power supply has four independent pairs of control sockets. It will be understood that although just one shape for sockets 100 and 102 is shown, the invention in various figures herein can include any known configuration of a network socket connection and can include different configurations on the same power supply when so desired. An optional indicator 120 can be associated with each pair of signal sockets.

FIG. 5 illustrates rear views of four alternative embodiments of a power supply according to specific embodiments of the invention, wherein each alternative includes at least one power input connection 140 and four independently controlled power outputs 150. One difference in embodiments is the shape and configuration of different connection sockets. It will be understood that a second power connection 140 (shown in dashed lines) may be included to bring additional power into the controlled box. Input connection sockets 140 and output controlled supply sockets 150 can comprise any shape of power socket connection and can include different shapes on the same power supply when so desired.

FIGS. 6A-B is a diagram showing a top plane view and front view of a power supply according to specific embodiments of the invention wherein the power supply has eight independent pairs of control sockets. As in FIGS. 4A-B, variations in shape of socket connections and mixtures of socket connections are possible.

FIG. 7 illustrates rear views of three alternative embodiments of a power supply according to specific embodiments of the invention, wherein each alternative includes at least one power input connection 140 and eight independently controlled power outputs 150. One difference in embodiments is the shape and configuration of different connection sockets.

Figure 8B:
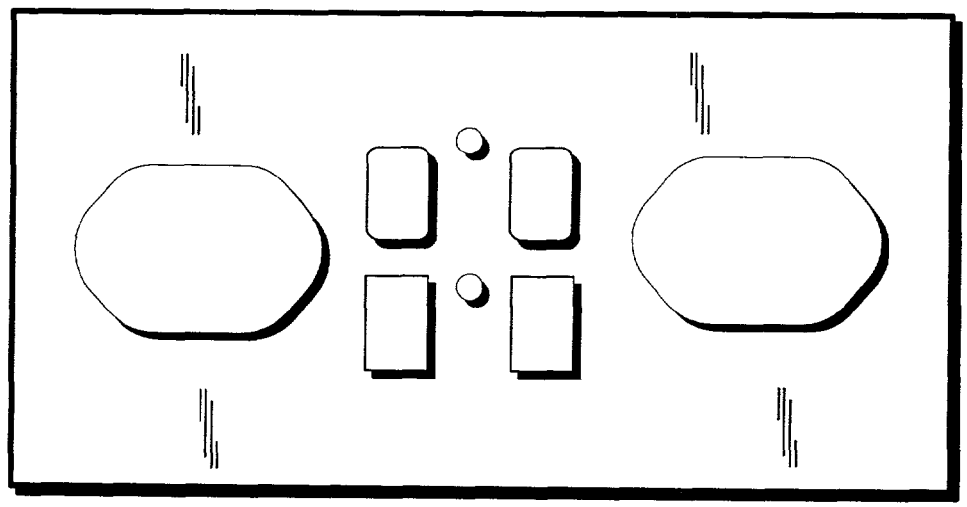
Figure 8C:
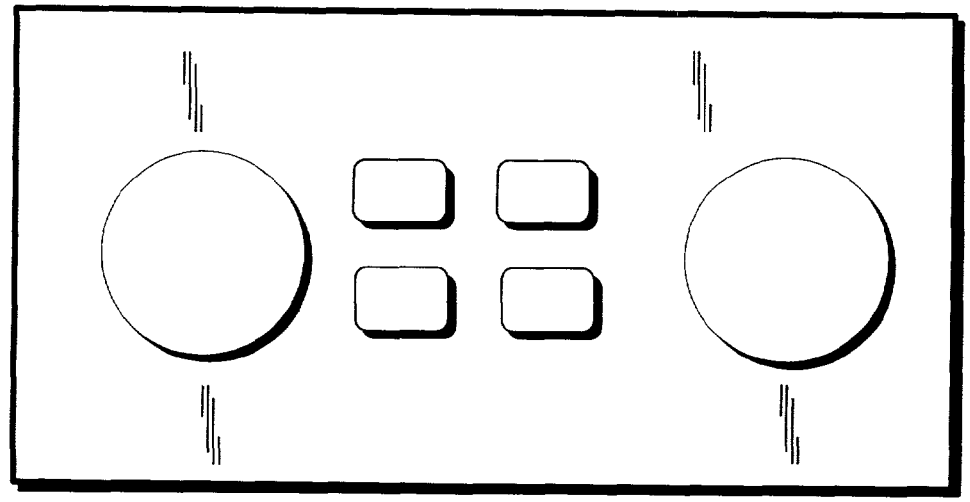

FIGS. 8A-C show alternative top plane views of a power supply according to alternative specific embodiments of the invention wherein there are two pair of control sockets and two controlled outputs with various possible arrangements of control signal sockets and controlled outputs.

Figure 9:
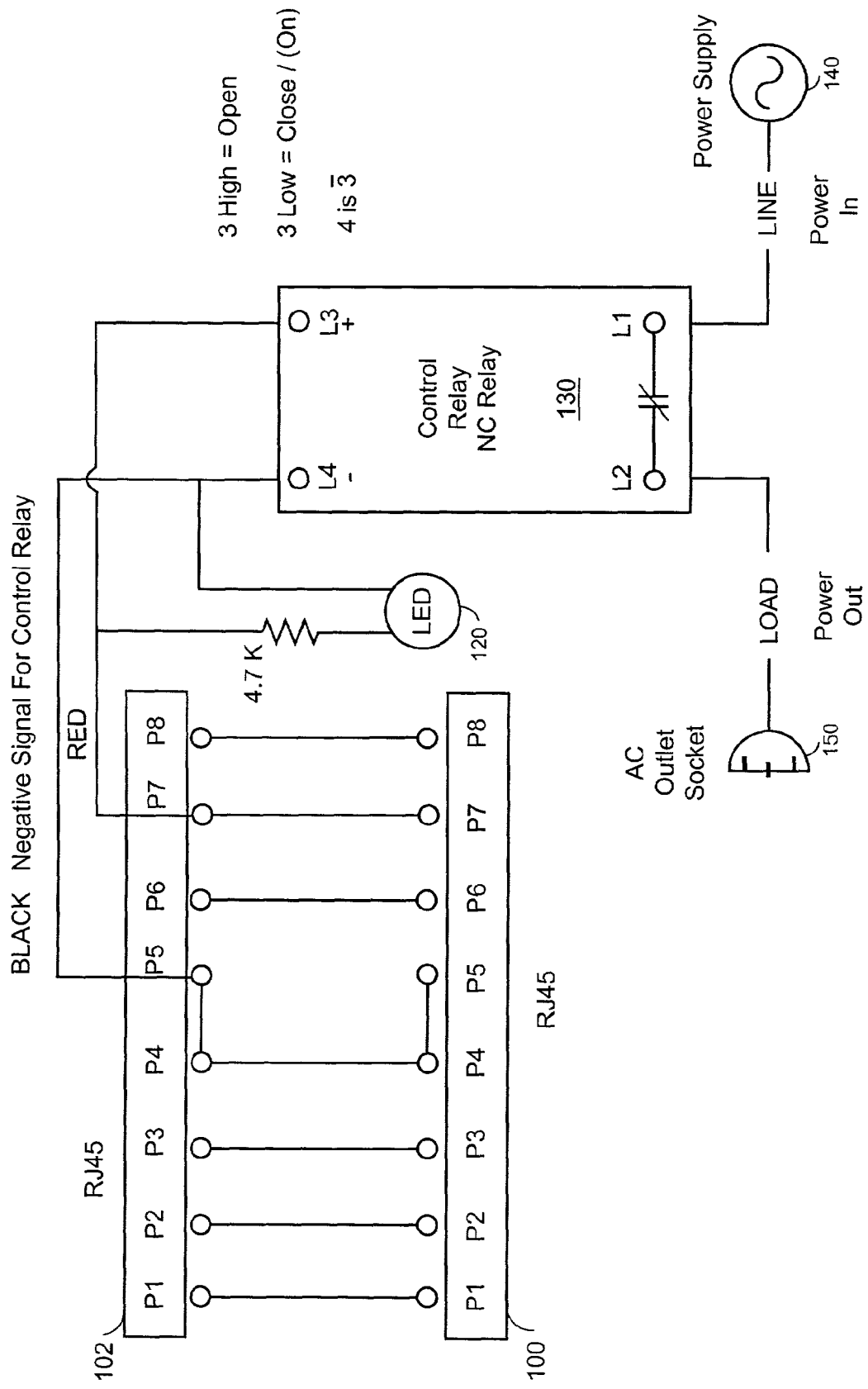
FIG. 9 is a simplified block diagram showing functional elements of one specific embodiment of the present invention for one controlled circuit.

FIG. 9 is a simplified block diagram showing functional elements of one specific embodiment of the present invention with an example of one controlled circuit. Shown are control sockets 100 and 102 (which in one specific embodiment may be standard RJ45 network sockets having pins as shown, but in other embodiments can include any type of network or communication connector), indicator 120 (which may be an LED), control relay 130. According to one embodiment of the invention, a network connection is made through sockets or receptacles 100 and 102 and in standard network data transmission, data passes through the connections without being affected by the circuits of the invention.

However, when a controlling network device such as a router wishes to cause a power cycle to the load connected to AC outlet 150, the controlling network device places a predefined signal on pin 7 and alternatively also on pin 4 or 5. The signal from pin 7 connects to pin 3, which when forced to the low state causes control relay 130 to open thereby disconnecting the power supply line from the load line and removing power from AC outlet 150. At the same time, according to one embodiment of the invention, an opposite signal is placed on pins 4 or 5 causing control relay L4 to go to a high state which also forces control relay 130 to disconnect the power supply line from the loaded AC outlet.

LED 120 is an optional indicator light that may be variously connected to indicate when outlet 150 is on or off.

In the embodiment described above, control relay 130 is normally in the closed position connecting the power supply line to the load line, and a specific signal on a pin of the sockets must be asserted to open the relay and thereby disconnect the power supply.

In an alternative embodiment, control relay 130 is normally in the open position disconnecting the power supply line from the load line, and a specific signal on a pin of the sockets must be asserted to close the relay and thereby connect the power supply.

One advantage of the current invention is that a control signal for the power supply is generated as a standard network signal and does not require a separate communication interface with the controlled network device, such as an RS232 connection. The control signal for AC outlet 150 could also be delivered through a single control socket such as 102. However, this is a less desirable alternative because it would require a dedicated line from the controlling network device to the power supply, rather than the pass-through network connection.

Figure 10:
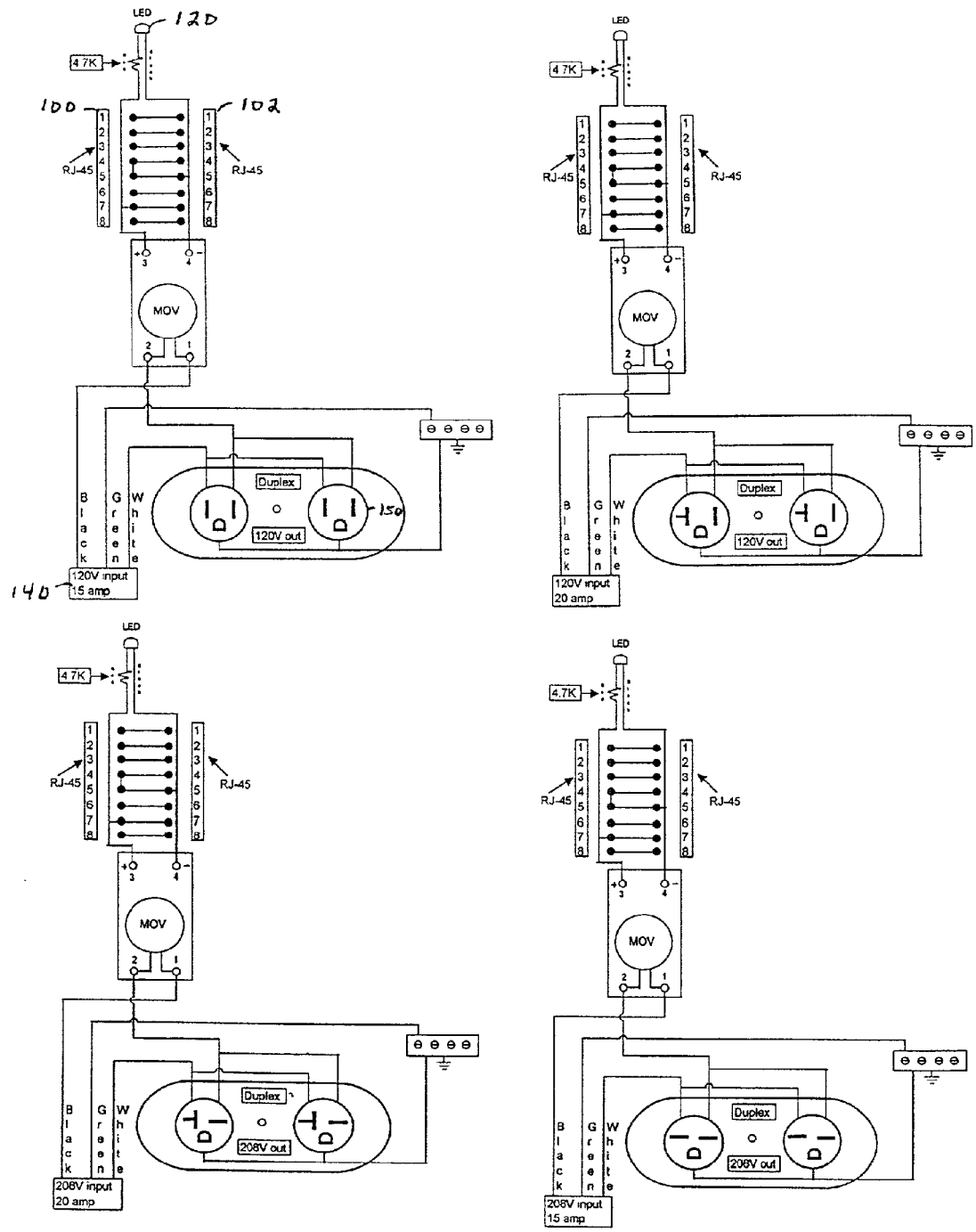
FIG. 10 shows four alternative wiring diagrams of a power supply according to specific embodiments of the invention, wherein each alternative includes one pair of control signal sockets 100 and 102, a power input connection 140, and dual commonly-controlled power outputs 150.

FIG. 10 shows four alternative wiring diagrams of a power supply according to specific embodiments of the invention, wherein each alternative includes one pair of control signal sockets 100 and 102, a power input connection 140, and dual commonly-controlled power outputs 150.

Figure 11:
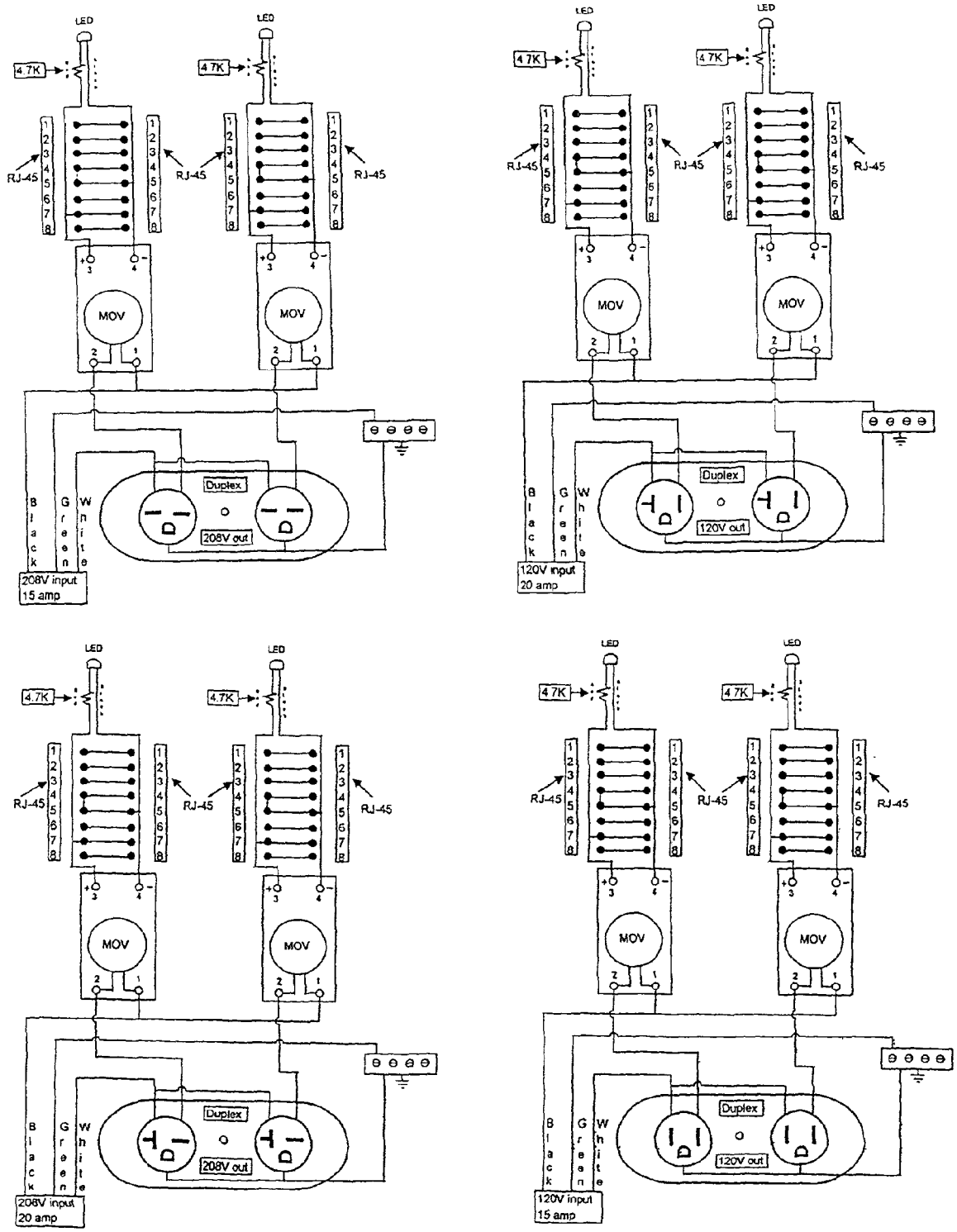
FIG. 11 shows four alternative wiring diagrams of a power supply according to specific embodiments of the invention, wherein each alternative includes two pairs of control signal sockets 100 and 102, a power input connection 140, and two independently-controlled power outputs 150.

FIG. 11 shows four alternative wiring diagrams of a power supply according to specific embodiments of the invention, wherein each alternative includes two pairs of control signal sockets 100 and 102, a power input connection 140, and two independently-controlled power outputs 150.

Figure 12A:
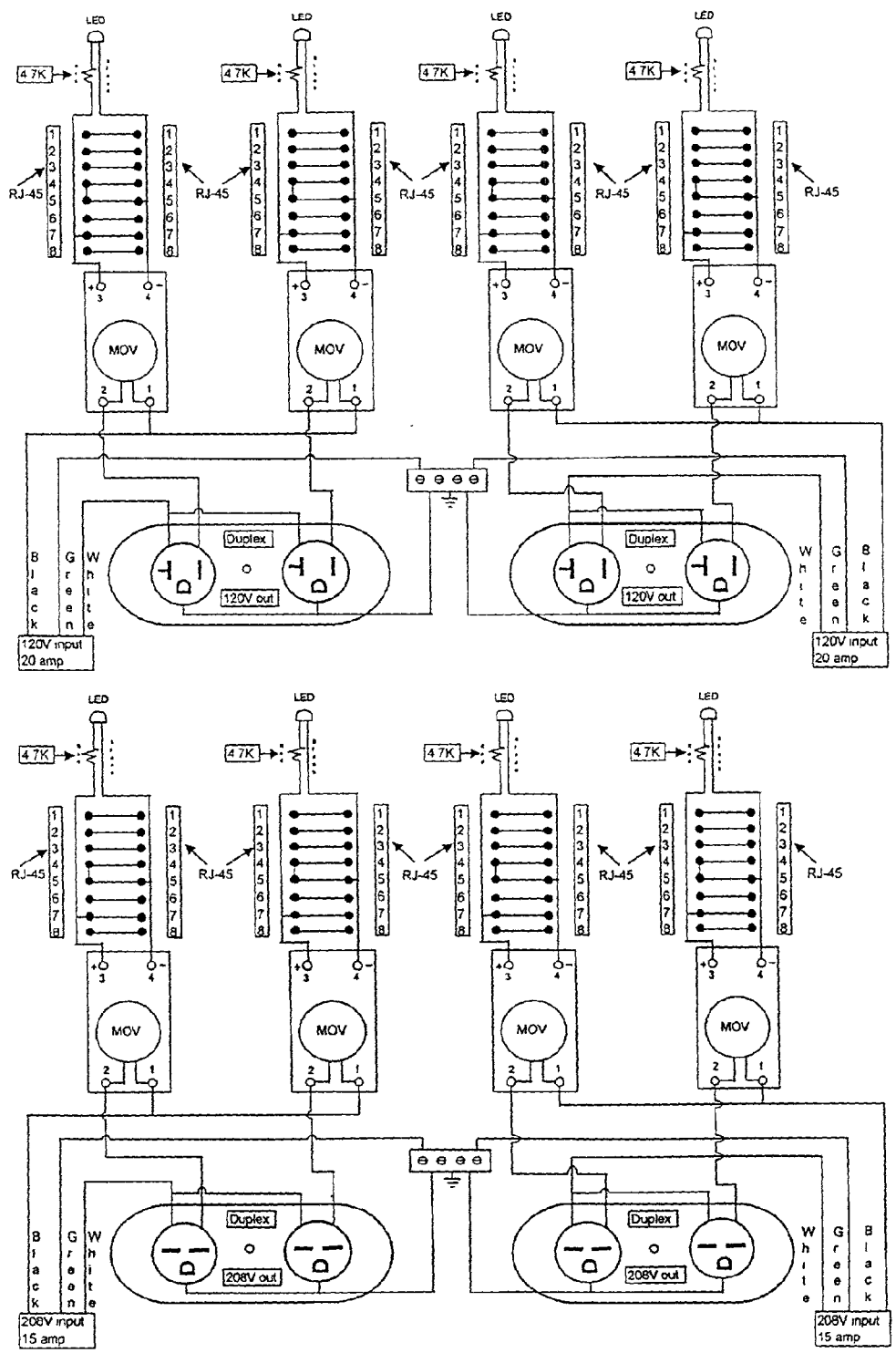

FIGS. 12A-B show four alternative wiring diagrams of a power supply according to specific embodiments of the invention, wherein each alternative includes four pairs of control signal sockets 100 and 102, two power input connections 140, and four independently-controlled power outputs 150.

FIG. 13 shows two alternative wiring diagrams of a power supply according to specific embodiments of the invention, wherein each alternative includes eight pairs of control signal sockets 100 and 102, two power input connections 140, and eight independently-controlled power outputs 150.

Figure 14:
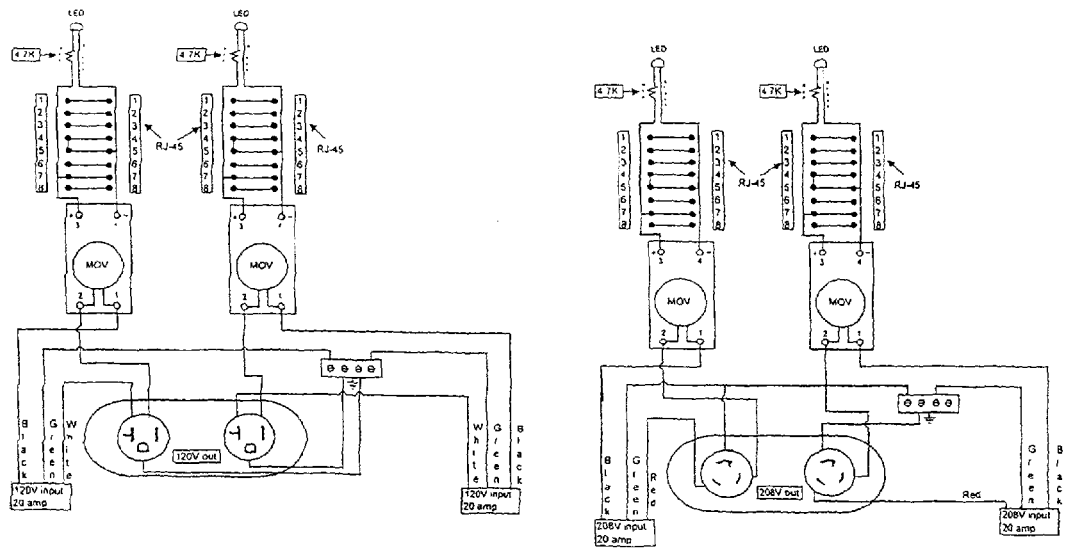
FIG. 14 shows two alternative wiring diagrams of a power supply according to specific embodiments of the invention, wherein each alternative includes two pairs of control signal sockets, two power input connections, and two independently-controlled power outputs.

FIG. 14 shows two alternative wiring diagrams of a power supply according to specific embodiments of the invention, wherein each alternative includes two pairs of control signal sockets, two power input connections, and two independently-controlled power outputs.

Figure 15A:
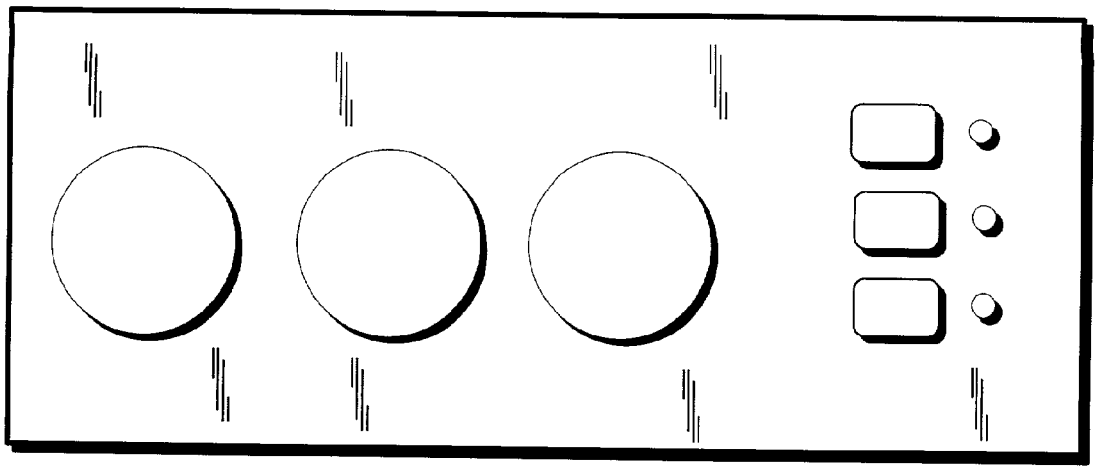
FIGS. 15A-C show alternative top plane views of an alternative power supply wherein there are three independent control sockets and three controlled outputs with various possible arrangements of control signal sockets and controlled outputs.
Figure 15B:
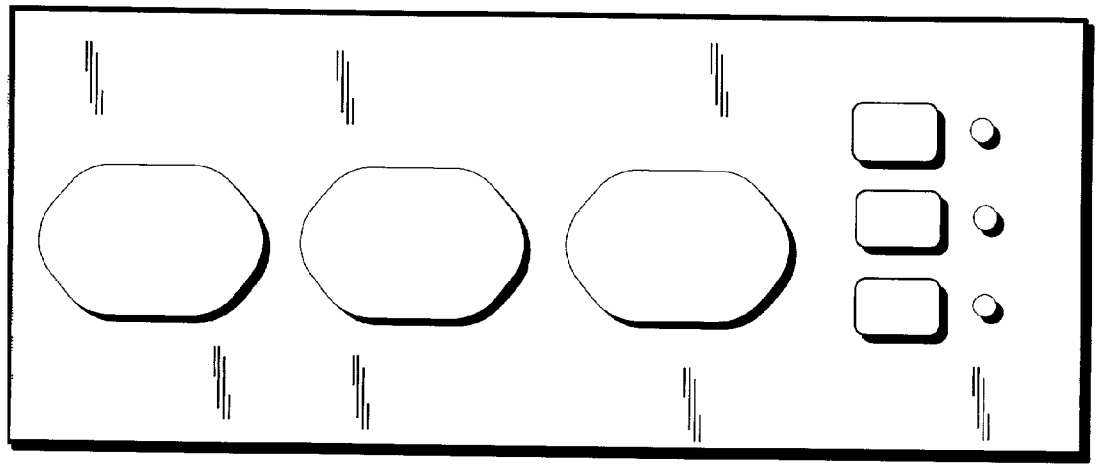
Figure 15C:
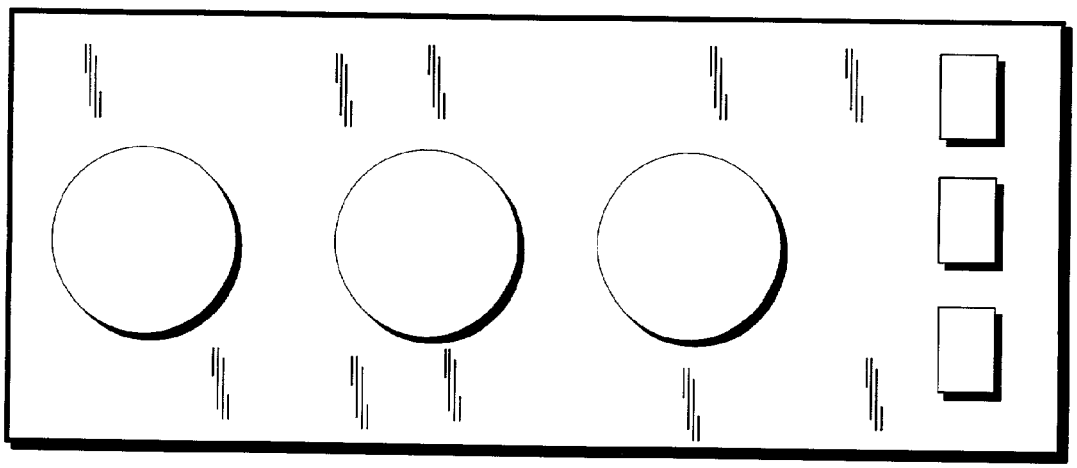

FIGS. 15A-C show alternative top plane views of an alternative power supply wherein there are three independent control sockets and three controlled outputs with various possible arrangements of control signal sockets and controlled outputs.

Figure 16:
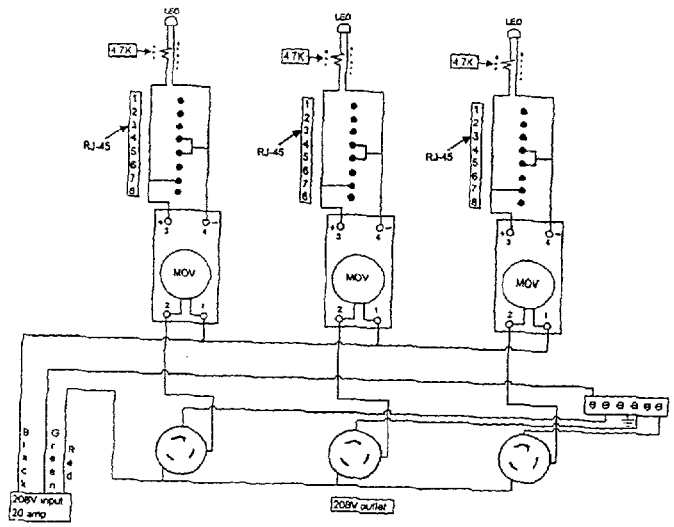
FIG. 16 shows a wiring diagram of a alternate power supply including three control signal sockets, a power input connection, and three independently-controlled power outputs.

FIG. 16 shows a wiring diagram of a alternate power supply including three control signal sockets, a power input connection, and three independently-controlled power outputs.

Further Example Housing for Wire Mold Power Supply

Figure 17A:
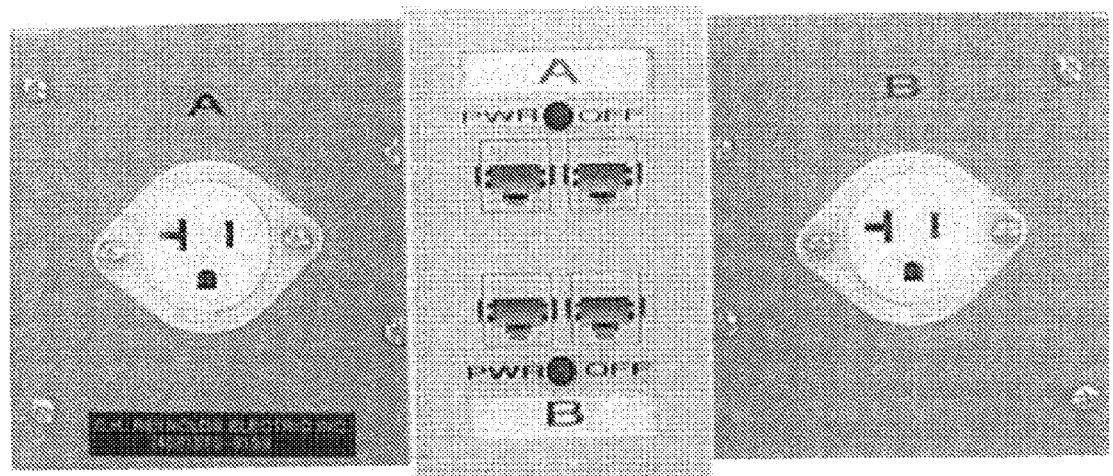
FIGS. 17A-C show front view, back view, and side view and dimensions for an example of an alternative embodiment of a power supply, as described in FIG. 8 and FIG. 11.
Figure 17B:
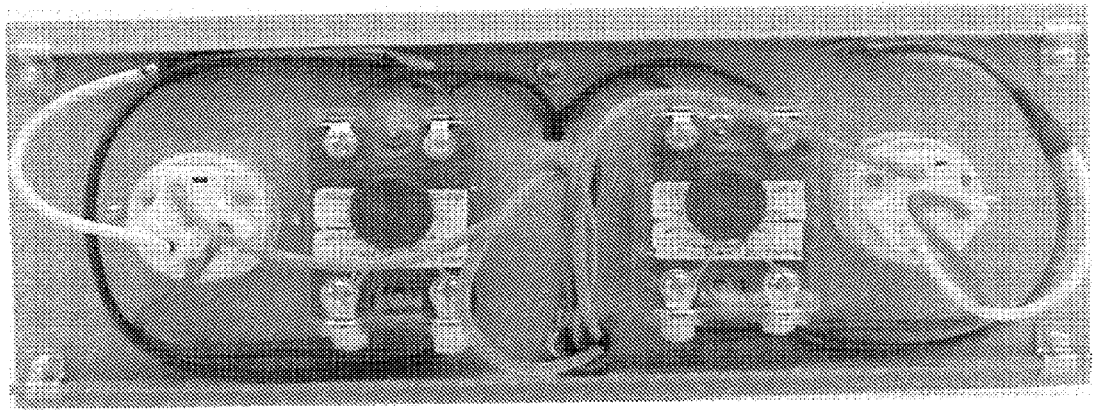
Figure 17C:
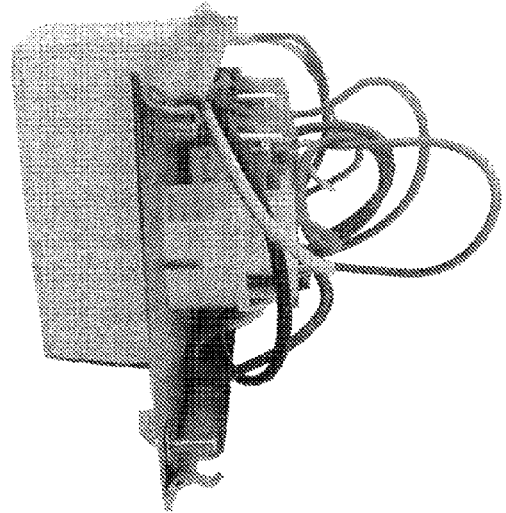
Figure 18A:
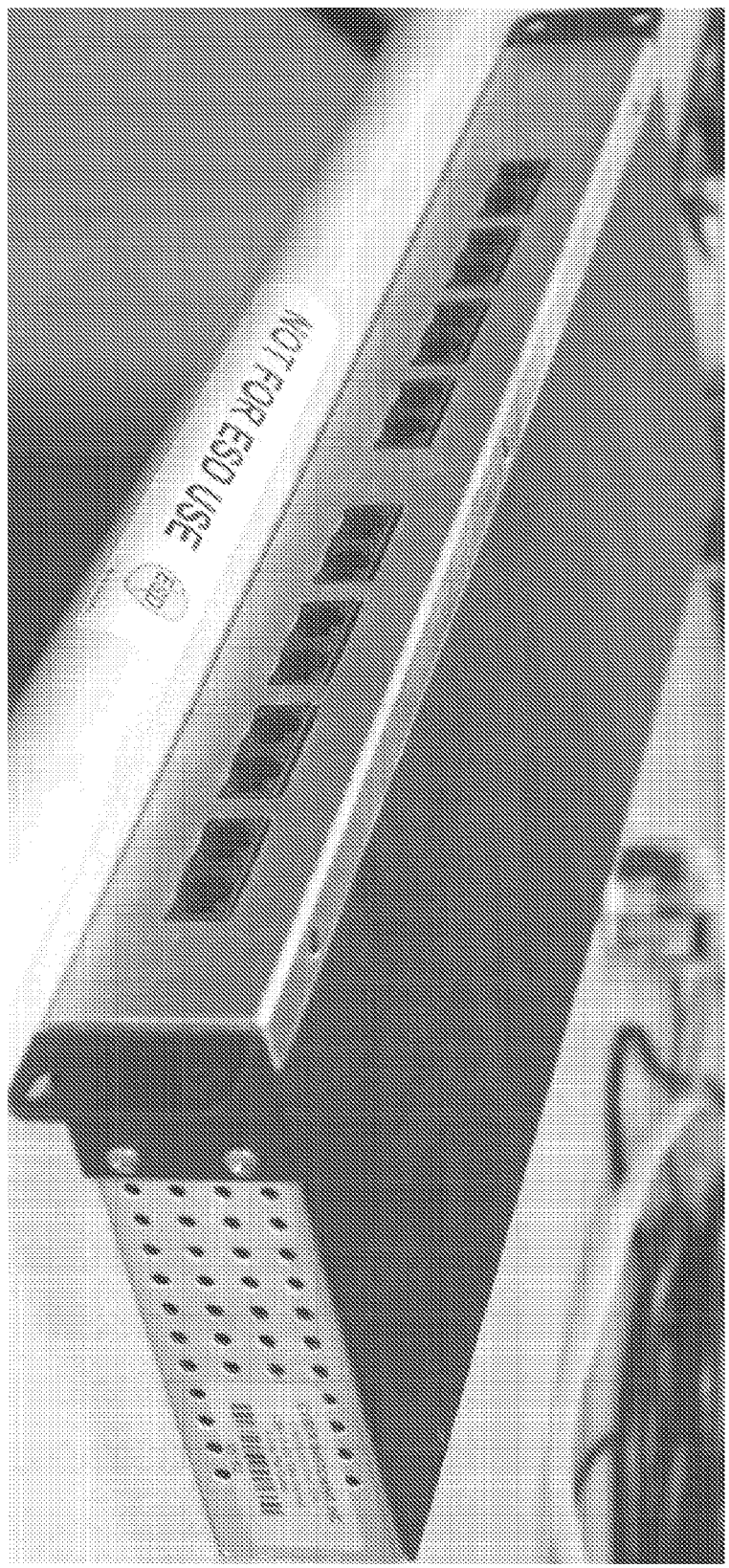
Figure 18B:
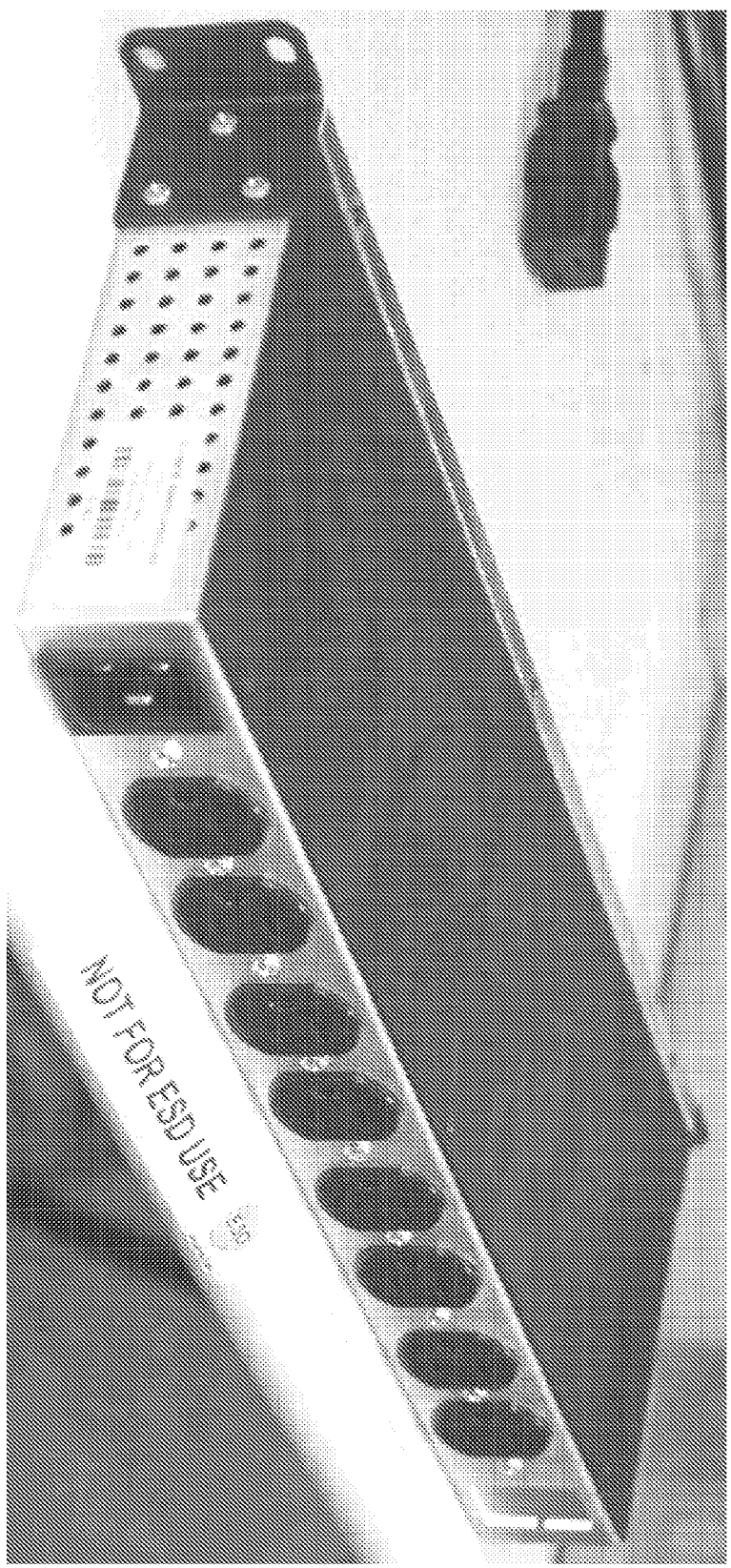

FIGS. 17A-C show front view, back view, and side view and dimensions for an example of an alternative embodiment of a power supply, as described in FIG. 8 and FIG. 11. This example shows one instance of wiring for a mounted power housing where the back of the power supply is mounted in a rack or wall and the front is exposed for connecting devices. It will be understood to those of skill in the art that a similar housing configuration can be used for other embodiments of the invention, such as those indicated in, for example, FIG. 8, FIG. 10, FIG. 11, FIG. 12, FIG. 13, FIG. 15, and/or FIG. 16.

Further Alternative Embodiments

In a further embodiment, recognizing that network equipment is widely used in different parts of the world with different power connections, a power connection is provided via a plug receptacle, which allows for different plug-in plugs. In a further embodiment, the invention can operate with different input power parameters, such as AC power based on a 50 or 60 Mhz cycle and AC power with voltages up to about 300 volts.

Further One Rack Unit Design

Figure 23:
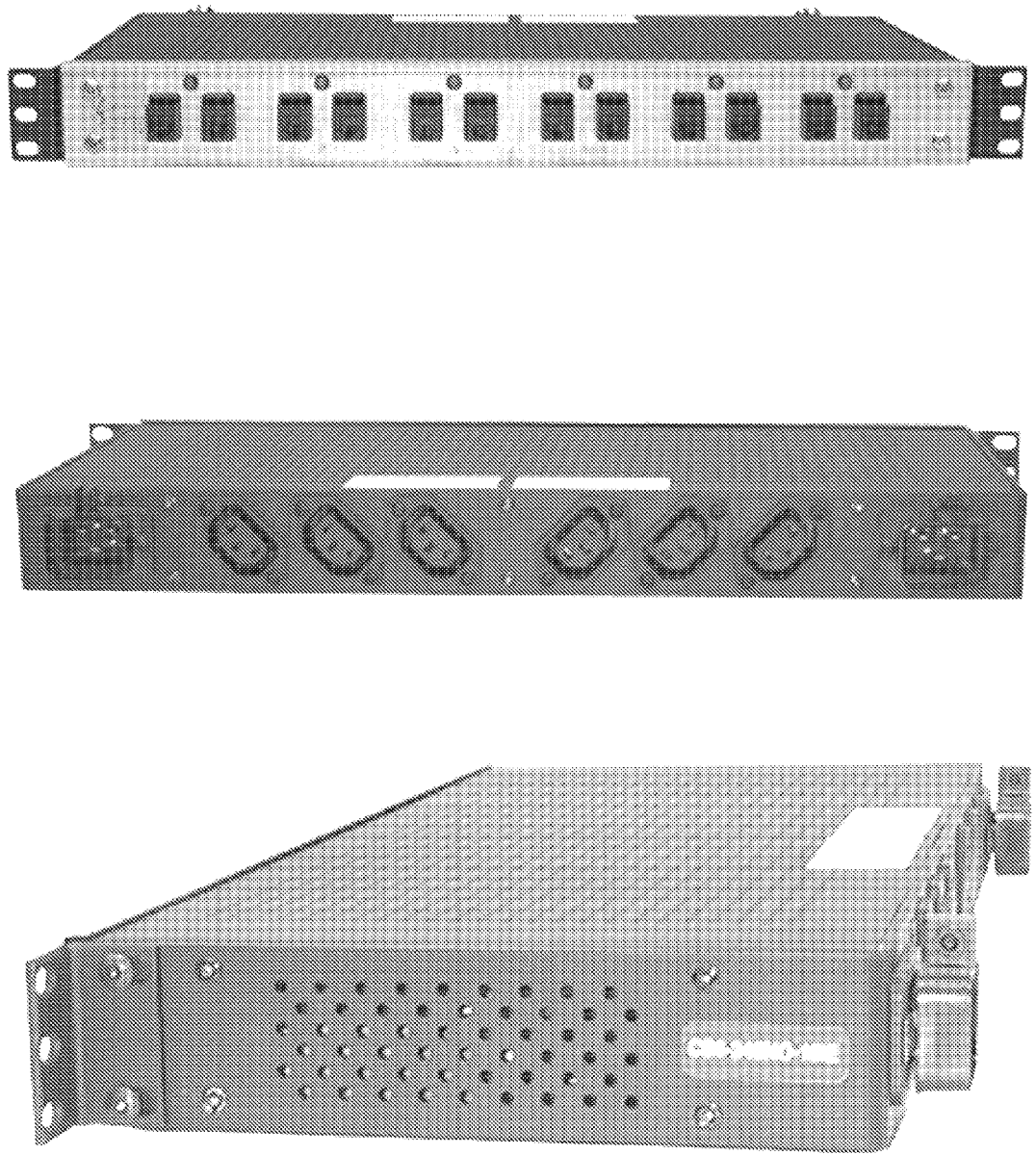
FIG. 23 illustrates an alternative design for a one-rack unit power supply having six controllable outlets and six pairs of network sockets.

According to one embodiment of the invention, one or more controlled power outlets are housed in a power supply housing, the housing having the desirable characteristic that the height of the housing allows it to be mounted in a standard network device rack occupying one rack unit. In one embodiment, to accomplish this configuration, controlled power outlets are distributed on one surface of the housing at the angle as shown and paired network sockets for receiving a control signal are distributed on a different surface. This design is shown in FIG. 23.

In a further embodiment, power into the controlled power supply is delivered via a detachable power cord. The detachable power cord has one end that attaches into the power socket and a different end that attaches into an outside power supply, such as a wall outlet. Thus, a controlled power supply according to this embodiment may be used with a variety of different available plug configurations, such as different outlets commonly provided in the U.S. versus European countries.

In a further embodiment, the circuitry in a power supply can operate with a range of different incoming supply voltages and currents and provide a controlled supply output at the available voltage or current.

Various embodiments of the invention provide different configurations of, such as supplies with one independently controlled supply outlet circuit, with two circuits, with four circuits, with eight circuits, or with some other number of circuits that can be mounted in the available space. In each case, a pair of network connectors is provided for each independently controlled outlet (or group of outlets) and a network signal is routed through the connectors to provide a control signal. In various embodiments, where space permits, more than one outlet may be supplied for a single control signal pair, but in such cases, power in that outlet is controlled by the same network signal.

In one embodiment, a housing as shown in FIG. 23 has the desirable characteristic that the height (h) of the housing is such that the housing can be mounted in a standard network device rack and will occupy only one rack unit. As is known in the art, one rack unit in one well-known device standard is 1.75 inches.

Figure 19A:
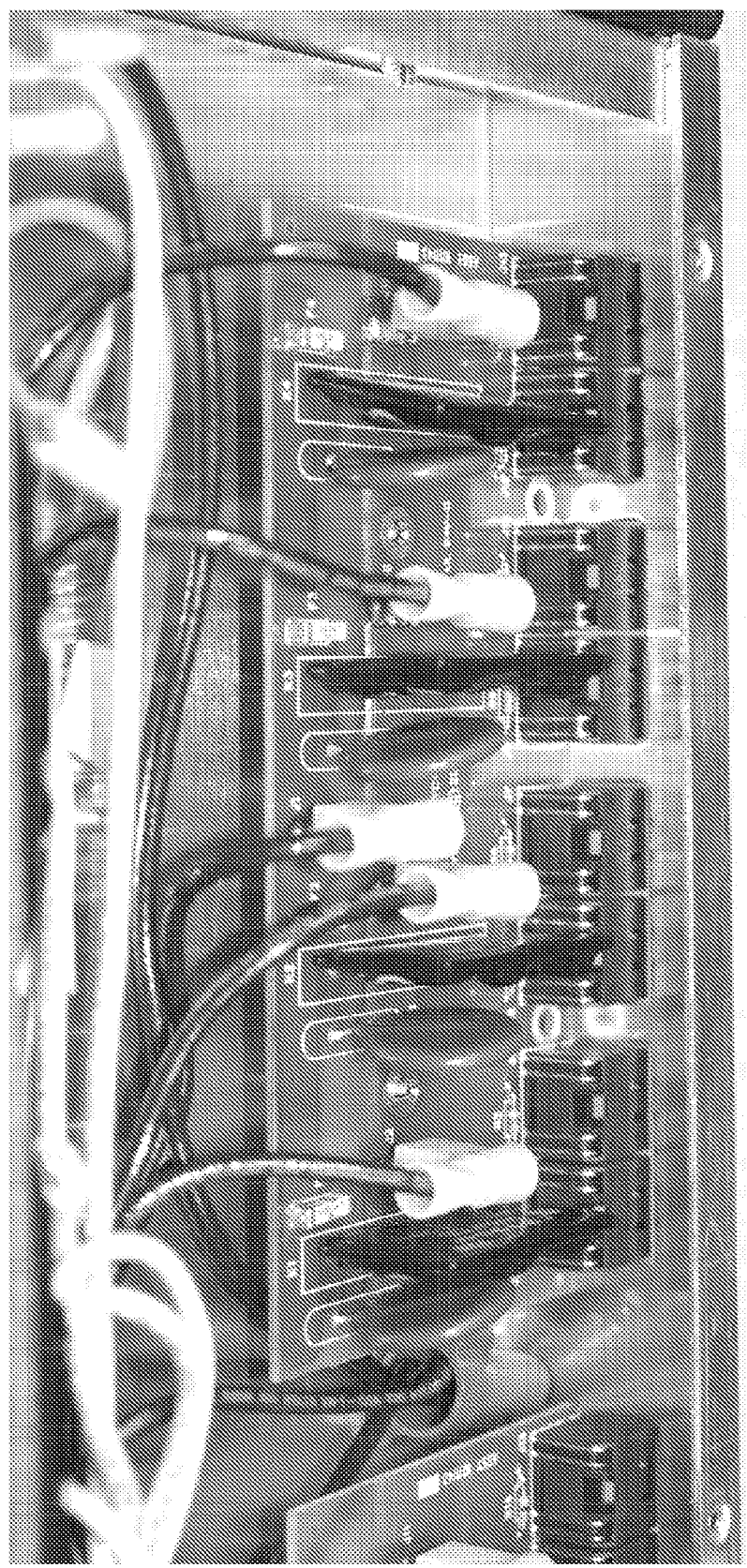
FIGS. 19A-B show the internal circuit board, components and wiring of a further embodiment e.g., as illustrated in FIG. 18, according to specific embodiments of the invention.
Figure 19B:
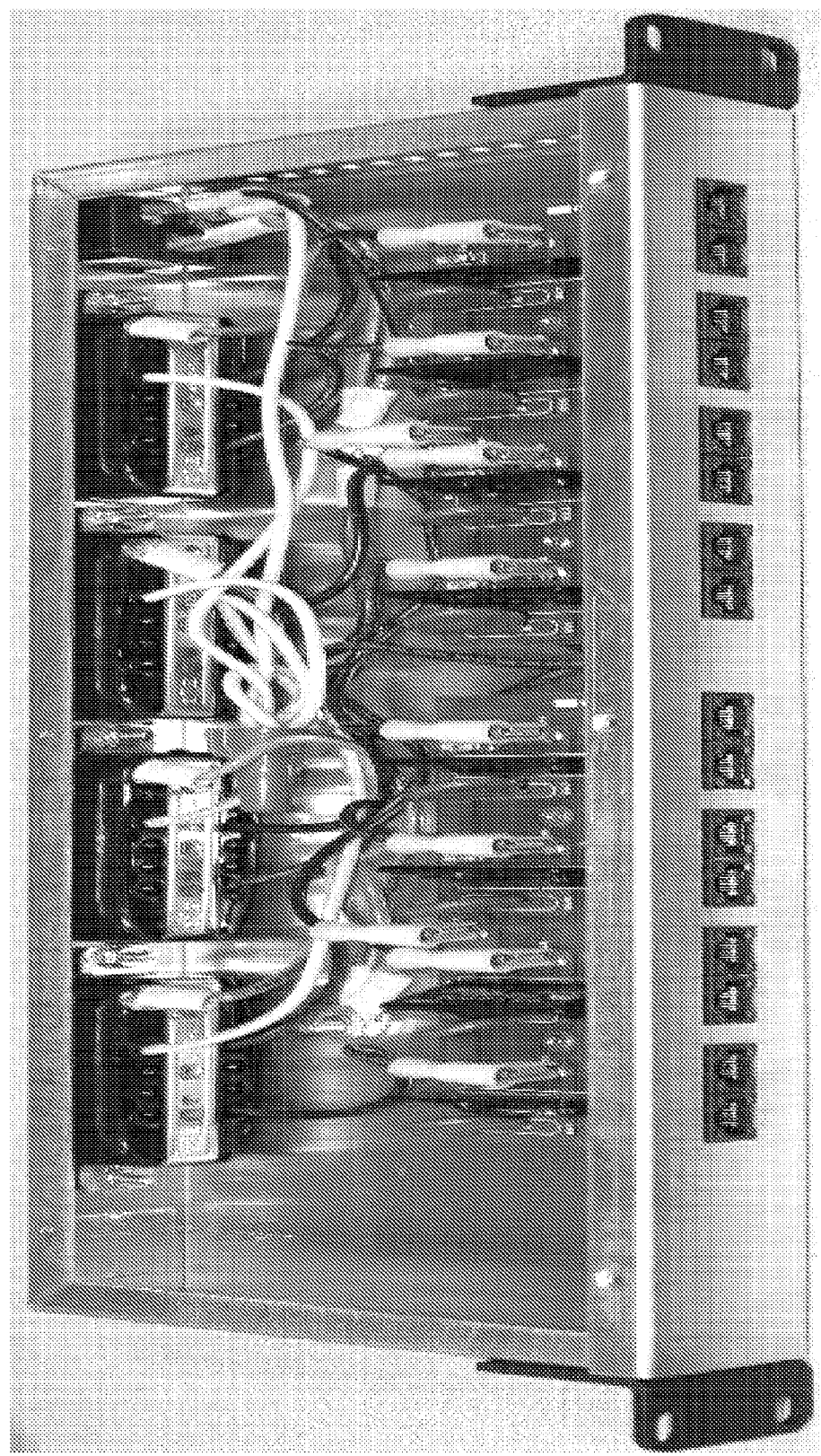
Figure 20A:
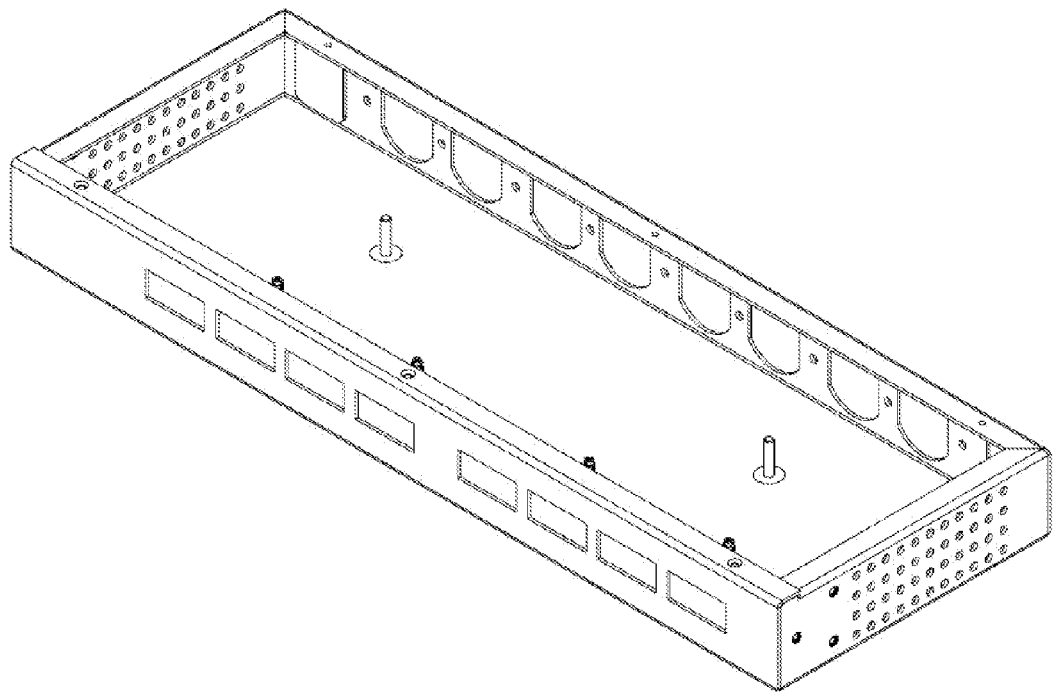
Figure 20B:
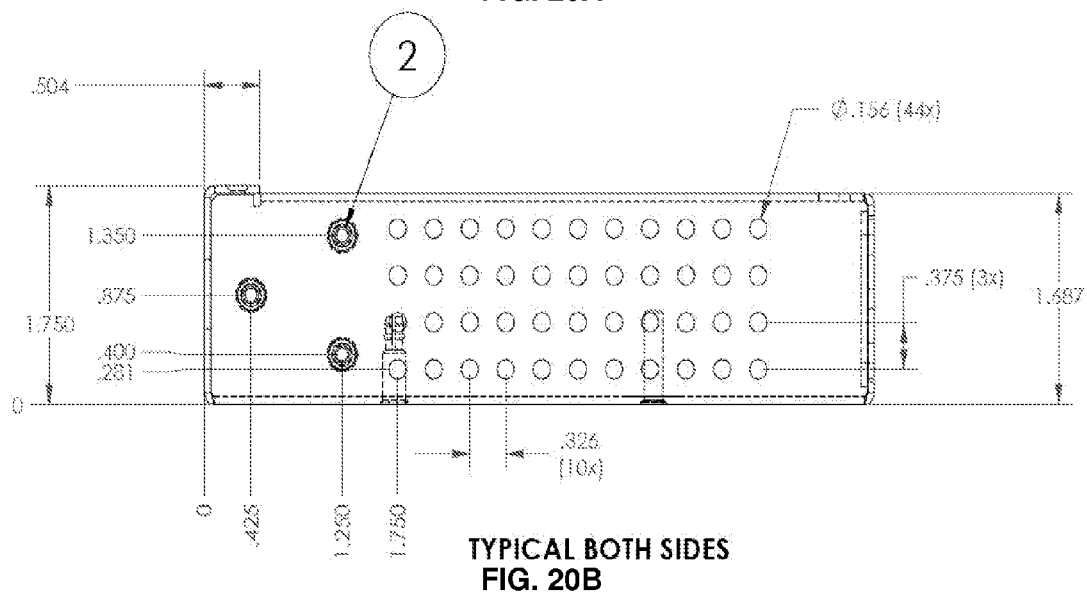
Figure 20C:
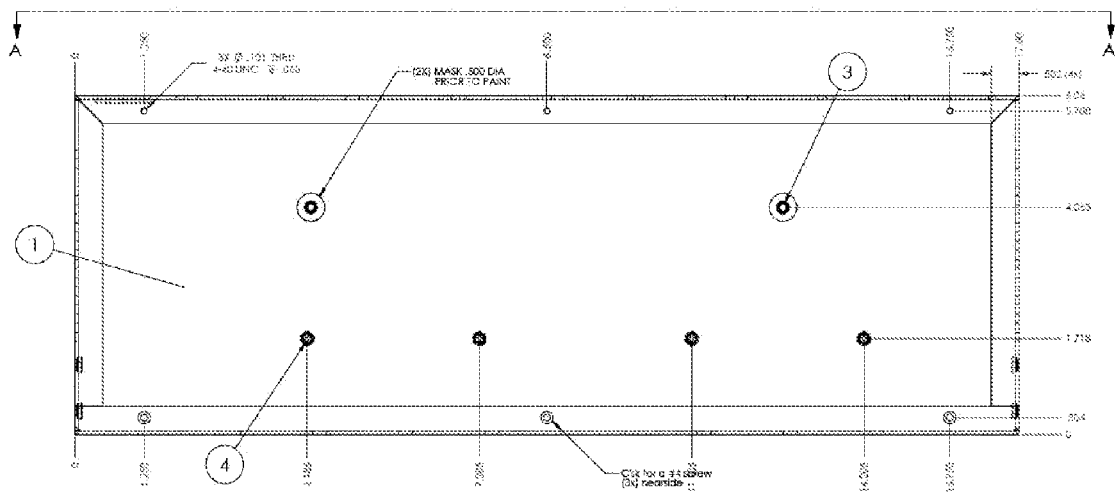
Figure 20D:
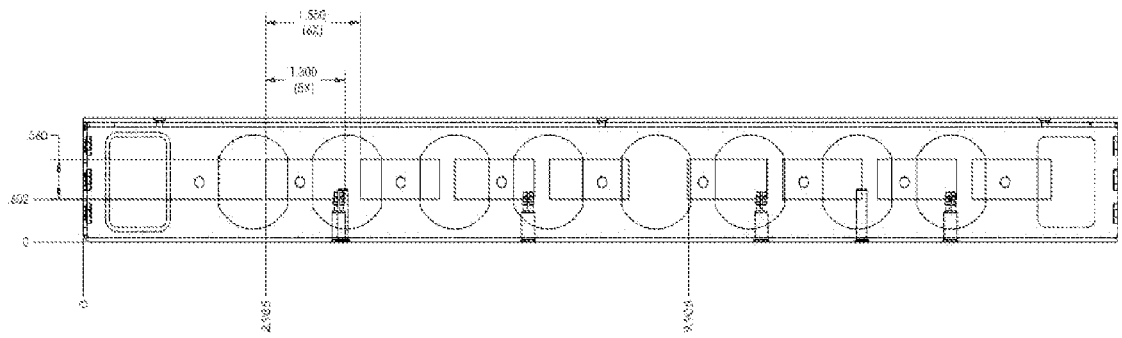
Figure 21A:
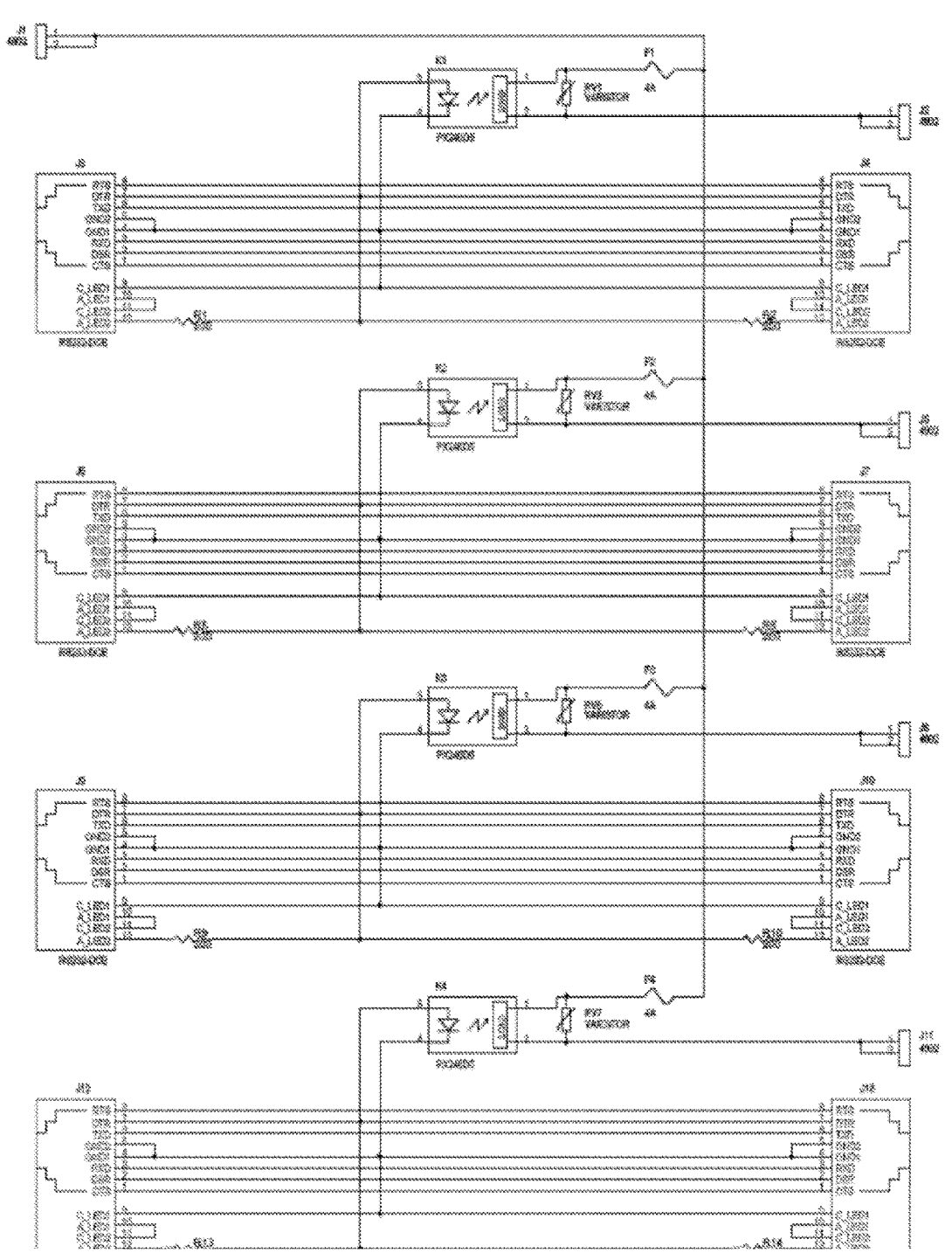
FIGS. 21A-B show schematic circuit component drawings of a further embodiment e.g., as illustrated in FIG. 18, according to specific embodiments of the invention.
Figure 21B:
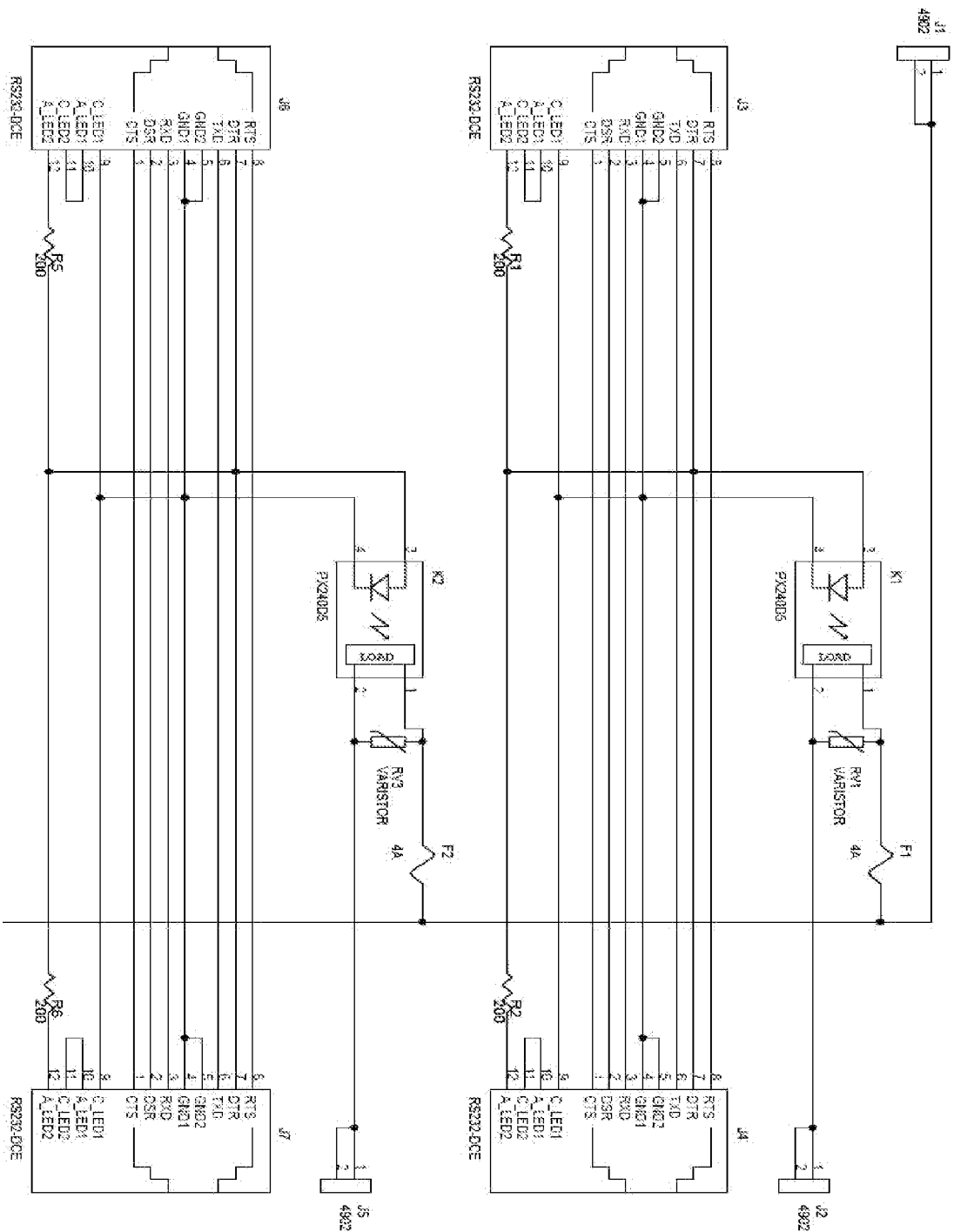
Figure 22A:
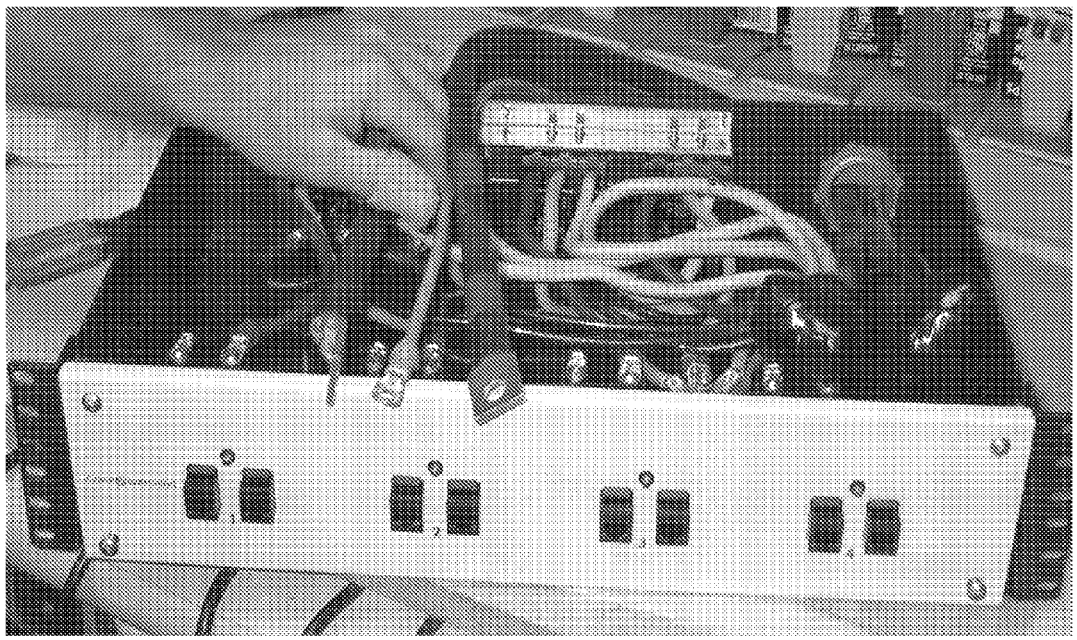
Figure 22B:
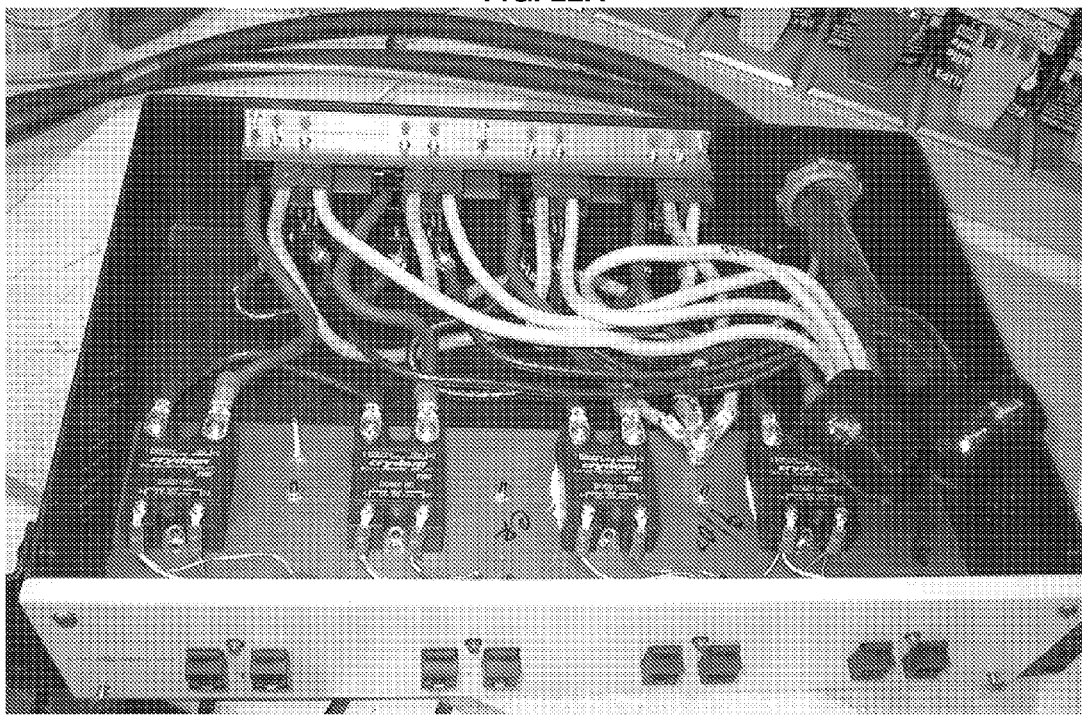
Figure 22C:
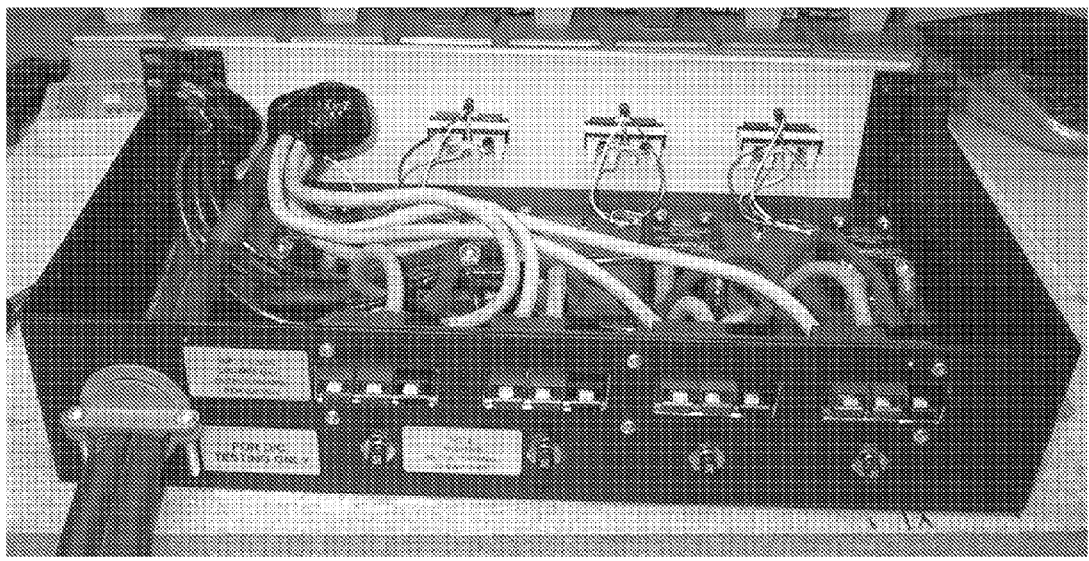
Figure 22D:
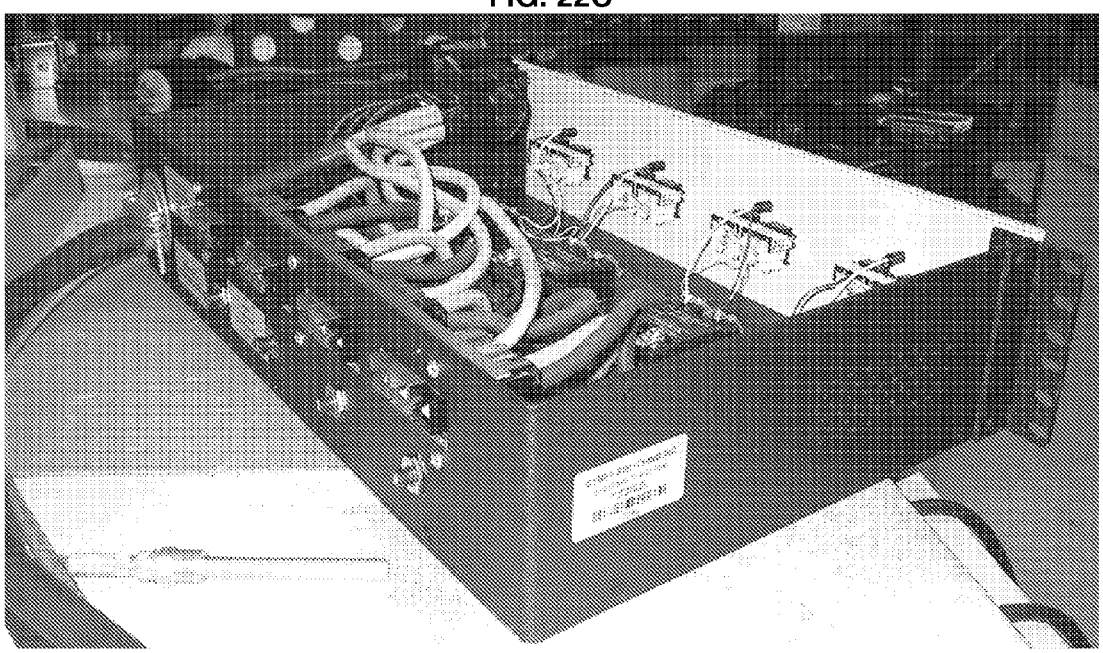

One Rack Unit Design Using Printed Circuit Boards and 2-Outlet Power Connection Boxes FIGS. 18A-D show the external appearance of a housing and network sockets and power outlets of a further embodiment according to the present invention. FIGS. 19A-B show the internal circuit board, components and wiring of a further embodiment e.g., as illustrated in FIG. 18, according to specific embodiments of the invention. FIGS. 20A-E show schematic line drawings for an external housing components of a further embodiment according to the present invention. These figures, taken togher, illustrate a novel design for a remotely switchable power supply according to specific embodiments of the invention that utilizes two integrated circuit boards having 4 control relays each, network connectors with integrated LED indicators, and more standardized double-outlet power connector housings according to specific embodiments of the invention. This design can operate according to the various methods described above for remotely controllable power supplies.

In a further embodiments, power into any of the various controlled power supplies is delivered via a detachable power cord. The detachable power cord has one end that attaches into the power socket and a different end that attaches into an outside power supply, such as a wall outlet. Thus, a controlled power supply according to this embodiment may be used with a variety of different available plug configurations, such as different outlets commonly provided in the U.S. versus European countries.

In a further embodiment, the circuitry in a power supply can operate with a range of different incoming supply voltages and currents and provide a controlled supply output at the available voltage or current.

Various embodiments of the invention provide different configurations of, such as supplies with one independently controlled supply outlet circuit, with two circuits, with four circuits, with eight circuits, or with some other number of circuits that can be mounted in the available space. In each case, a pair of network connectors is provided for each independently controlled outlet (or group of outlets) and a network signal is routed through the connectors to provide a control signal. In various embodiments, where space permits, more than one outlet may be supplied for a single control signal pair, but in such cases, power in that outlet is controlled by the same network signal.

This embodiment, also has the desirable characteristic that the height (h) of the housing is such that the housing can be mounted in a standard network device rack and will occupy only one rack unit. As is known in the art, one rack unit in one well-known device standard is 1.75 inches.

Large Current DC Power Supply

FIGS. 22A-E show the external appearance and internal wiring and components of a two-rack unit high-current DC power supply with pass-through network control according to specific embodiments of the invention. On a power-supply side, the unit provides four different sets of DC power connectors (for POS, NEG, and GND, as will be understood in the art). In this particular embodiment, the GND and POS supplies are shared and uncontrolled, and the four NEG supplies are each separately controlled via a relay that connects to paired network sockets on the opposite face. In this example design, LED indicators are provided between each pair of network sockets to indicate when a DTR signal in signaling the power supplies to be in a particular controlled state (e.g., ON or OFF). This design also includes four separate circuit breakers (e.g., 50 amps) with reset buttons located beneath the 3 DC supply connectors. Such a power supply can provide large current load supply (e.g., 175 Amps) at various standard DC voltages, e.g., +48, 0, −48.

Conclusion

The invention has now been explained with regard to specific embodiments. Variations on these embodiments and other embodiments will be apparent to those of skill in the art. The invention therefore should not be limited except as provided in the attached claims. It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

What is claimed is:

1. A controllable power supply for remotely controlling computer network communication equipment comprising:
a housing having at least two distinguishable surfaces and suitable for mounting in a network device rack holding network routers;
at least three independent first network sockets located on one of said distinguishable surfaces, said sockets being of a type for connecting to a network router;
wherein each of said first network sockets connects to a separate standard network cable from a network router;
wherein each of said first network sockets comprises:
a first separate control signal pin for connecting to a first separate and independent wire in said separate standard network cable and for receiving a separate and independent control signal and not receiving other network communication;
a second separate network data transmission pin for receiving encoded multi-bit digital network data on a second separate and independent wire in said separate standard network cable;
at least three independently controlled power supply sockets located on one of said distinguishable surfaces; and
at least three separate and independent control circuits within said housing, each control circuit operatively connected to one of said first network sockets;
each of said control circuits operatively connected to one of said power supply sockets;
wherein power to each of said power supply sockets is separately and independently turned on or off directly in response to a signal change between a high and low state of said separate and independent control signals received at said first sockets without otherwise decoding said control signals;
said control signals received from a controlling network device router;
said circuits configured such that standard network data transmission on said second independent transmission pin is entirely independent of said control circuits; and
a power input connection for connecting to an external power source.

2. The controllable power supply according to claim 1, further comprising: at least three independent second network sockets wherein network signals on said second separate and independent network data transmission wires pass through said housing over a data transmission paths between said first sockets and said second sockets that are separate and independent from said control signals and said circuits and have adequate required clearance without experiencing interference by said control circuits and components of said power supply.

3. The controllable power supply according to claim 1 wherein said control circuits comprises at least three control relays, each relay independently directly controlled by said control signal.

4. The controllable power supply according to claim 3, wherein said first and second distinguishable surfaces are parallel to each other.

5. The controllable power supply according to claim 3, wherein said housing constitutes a box comprising six surfaces.

6. The controllable power supply according to claim 5 wherein said housing comprises a top surface, a bottom surface, a front surface, a rear surface, a left surface, and a right surface.

7. The controllable power supply according to claim 6 wherein said first network socket is located on said front surface and said power supply socket is located on said rear surface.

8. The controllable power supply according to claim 6, further comprising: at least three independent second network sockets wherein a network signal can pass over separate data wires from said control signal between said first socket and said second socket and have adequate required clearance without experiencing interference by said control circuitry and components of said power supply; said first and second sockets forming a first pair of sockets and located on said front surface; one or more additional pairs of network sockets located on said front surface, each pair receiving a control signal for a set of one or more power supply sockets located on said rear surface.

\* \* \* \* \*